US012553349B2

(12) United States Patent
Snider et al.

(10) Patent No.: US 12,553,349 B2
(45) Date of Patent: Feb. 17, 2026

(54) VIBRATION DAMPENING SYSTEM INCLUDING RESONANT-TUNED ELONGATED BODY FOR DAMPER ELEMENT(S) FOR TURBINE COMPONENT

(71) Applicant: GE Infrastructure Technology LLC, Greenville, SC (US)

(72) Inventors: Zachary John Snider, Pelzer, SC (US); John McConnell Delvaux, Fountain Inn, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 225 days.

(21) Appl. No.: 18/343,987

(22) Filed: Jun. 29, 2023

(65) Prior Publication Data

US 2025/0003341 A1 Jan. 2, 2025

(51) Int. Cl.
*F01D 5/16* (2006.01)

(52) U.S. Cl.
CPC ............ *F01D 5/16* (2013.01); *F05D 2260/96* (2013.01)

(58) Field of Classification Search
CPC ... F01D 5/16; F01D 5/26; F01D 25/06; F05D 2260/96; B33Y 80/00
See application file for complete search history.

(56) References Cited

U.S. PATENT DOCUMENTS

| | | | | |
|---|---|---|---|---|
| 1,833,751 A * | 11/1931 | Kimball | F01D 5/16 | 416/232 |
| 1,833,754 A * | 11/1931 | Paget | F01D 5/16 | 416/500 |
| 2,412,615 A * | 12/1946 | Alan | F01D 5/16 | 416/500 |
| 2,999,669 A * | 9/1961 | Mcginnis | F01D 5/16 | 416/500 |
| 4,475,722 A | 10/1984 | Paton et al. | | |
| 4,738,437 A | 4/1988 | Paton et al. | | |
| 5,165,860 A * | 11/1992 | Stoner | F01D 5/16 | 416/500 |

(Continued)

FOREIGN PATENT DOCUMENTS

| | | |
|---|---|---|
| CN | 108561487 A | 9/2018 |
| GB | 2071775 A | 9/1981 |

(Continued)

OTHER PUBLICATIONS

Non-Final Office Action in U.S. Appl. No. 18/343,953, mailed Jun. 20, 2024, 31 pages.

(Continued)

*Primary Examiner* — Nathaniel E Wiehe
*Assistant Examiner* — Aye S Htay
(74) *Attorney, Agent, or Firm* — Charlotte Wilson; James Pemrick; Hoffman Warnick LLC

(57) ABSTRACT

A vibration dampening system includes damper element(s) in a body opening of a turbine component. A resonant-tuned elongated body extends through the damper element(s) in the body opening. The elongated body is configured to resonate at a predefined resonant frequency, such as the same resonant frequency as turbine component at the body opening, to generate a force against the damper element(s) in the body opening. The damper element(s) have a surface in contact with the body opening and/or elongated body.

12 Claims, 24 Drawing Sheets

(56) References Cited

U.S. PATENT DOCUMENTS

| | | | | |
|---|---|---|---|---|
| 5,356,264 | A * | 10/1994 | Watson | F01D 25/04 416/500 |
| 5,568,749 | A | 10/1996 | Liposky | |
| 5,820,343 | A | 10/1998 | Kraft et al. | |
| 6,283,707 | B1 | 9/2001 | Chin | |
| 6,929,451 | B2 * | 8/2005 | Gregg | F01D 5/16 416/500 |
| 8,292,583 | B2 | 10/2012 | Marra | |
| 8,915,718 | B2 | 12/2014 | Dolansky et al. | |
| 9,267,380 | B2 | 2/2016 | Houston et al. | |
| 9,657,717 | B2 | 5/2017 | Ollgaard et al. | |
| 10,151,204 | B2 | 12/2018 | Houston et al. | |
| 10,808,788 | B2 | 10/2020 | Seeley et al. | |
| 11,187,089 | B2 | 11/2021 | Wondrasek et al. | |
| 11,371,358 | B2 | 6/2022 | Chakrabarti et al. | |
| 11,473,431 | B2 | 10/2022 | Greenberg et al. | |
| 11,976,565 | B2 | 5/2024 | Snider et al. | |
| 2003/0202883 | A1 * | 10/2003 | Davis | F01D 5/26 416/500 |
| 2005/0200062 | A1 | 9/2005 | Maurer et al. | |
| 2006/0280606 | A1 * | 12/2006 | Busbey | F01D 5/187 416/97 R |
| 2010/0008778 | A1 * | 1/2010 | Patrick | F01D 5/26 416/144 |
| 2010/0253114 | A1 | 10/2010 | Ohmiya et al. | |
| 2011/0038734 | A1 * | 2/2011 | Marra | F01D 5/147 416/204 A |
| 2013/0276457 | A1 | 10/2013 | Houston et al. | |
| 2013/0280045 | A1 | 10/2013 | Dolansky et al. | |
| 2018/0291976 | A1 | 10/2018 | Seeley et al. | |
| 2020/0291794 | A1 | 9/2020 | Greenberg et al. | |
| 2021/0172325 | A1 * | 6/2021 | Wondrasek | F01D 5/22 |
| 2021/0254478 | A1 * | 8/2021 | Chakrabarti | F01D 5/16 |
| 2022/0307375 | A1 | 9/2022 | Chakrabarti et al. | |
| 2024/0035384 | A1 | 2/2024 | Snider et al. | |

FOREIGN PATENT DOCUMENTS

| | | | |
|---|---|---|---|
| JP | S59150904 | A | 8/1984 |
| JP | 2006143087 | A | 6/2006 |
| JP | 2007137288 | A | 6/2007 |
| JP | 2014084676 | A | 5/2014 |

OTHER PUBLICATIONS

Notice of Allowance and Fees Due dated Feb. 5, 2025 for U.S. Appl. No. 18/343,953, 5 pages.

Final Office Action in U.S. Appl. No. 18/343,953, mailed Nov. 4, 2024, 15 pages.

Non-Final Office Action in U.S. Appl. No. 18/343,966, mailed Oct. 1, 2024, 22 pages.

Final Office Action dated Mar. 5, 2025 for related U.S. Appl. No. 18/343,966, 19 pages.

Extended European Search Report from European Patent Application No. 24180137.2 dated Sep. 16, 2024, 10 pages.

Extended European Search Report from European Patent Application No. 24180121.6 dated Sep. 16, 2024, 9 pages.

Notice of Allowance and Fees Due dated May 30, 2025 for U.S. Appl. No. 18/343,966, 7 pages.

* cited by examiner

VIBRATION DAMPENING SYSTEM INCLUDING RESONANT-TUNED ELONGATED BODY FOR DAMPER ELEMENT(S) FOR TURBINE COMPONENT

TECHNICAL FIELD

The disclosure relates generally to dampening vibration in a turbine component such as a nozzle or blade. More specifically, the disclosure relates to a vibration dampening system including a resonant-tuned elongated body for use with damper element(s) in a body opening of a turbine component.

BACKGROUND

One concern in turbine operation is the tendency of the turbine components, such as blades or nozzles, to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain frequencies and in many cases to vibrational stresses at secondary or tertiary frequencies. Nozzle airfoils and other turbine components experience similar vibrational stress. Variations in gas temperature, pressure, and/or density, for example, can excite vibrations throughout the rotor assembly, especially within the nozzle or blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations and/or component life. Damper elements in a turbine blade have been used to dampen vibration, but the centrifugal forces can result in locking of the damper elements together and/or preventing them from vibrating at the desired frequency in the turbine component, reducing their ability to dampen vibration.

BRIEF DESCRIPTION

All aspects, examples and features mentioned below can be combined in any technically possible way.

An aspect of the disclosure provides a vibration dampening system for dampening vibrations in a turbine component configured to be installed in a first body opening of the turbine component, the vibration dampening system comprising: one or more damper elements in the first body opening; a first resonant-tuned elongated body extending through an opening in the one or more damper elements in the first body opening, wherein the first resonant-tuned elongated body is configured to resonate at a first predefined resonant frequency, whereby the first resonant-tuned elongated body generates a force against the one or more damper elements in the first body opening; and wherein each of the one or more damper elements in the first body opening has a surface in contact with at least one of the first body opening and the first resonant-tuned elongated body.

Another aspect of the disclosure includes any of the preceding aspects, and the first resonant-tuned elongated body includes at least one of the following characteristics of the first resonant-tuned elongated body selected to generate the first predefined resonant frequency during operation of the turbine component: a length, at least one outer dimension, an outer dimension taper along a length thereof, a wall thickness at at least one location, a material, at least one attachment location to the turbine component, at least one attachment type to the turbine component, and a number of the elongated bodies.

Another aspect of the disclosure includes any of the preceding aspects, and the one or more damper elements in the first body opening includes a plurality of damper elements stacked together along at least some portion of the first resonant-tuned elongated body.

Another aspect of the disclosure includes any of the preceding aspects, and the one or more damper elements in the first body opening are selected from a group comprising: a damper pin, a damper element having flexible legs, a spring-suspended damper element, a nested damper pin, a plate member with an opening, a helical metal ribbon spring, and a wire mesh.

Another aspect of the disclosure includes any of the preceding aspects, and the one or more damper elements in the first body opening includes a first plurality of stacked washers having a first outer dimension and a second plurality of stacked washers having a second outer dimension, wherein the first outer dimension and the second outer dimension are different.

Another aspect of the disclosure includes any of the preceding aspects, and the first outer dimension matches an inner dimension of the first body opening, and the second outer dimension is smaller than the inner dimension of the first body opening.

Another aspect of the disclosure includes any of the preceding aspects, and the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

Another aspect of the disclosure includes any of the preceding aspects, and the turbine component includes a second body opening, and the vibration dampening system further comprises: one or more damper elements in the second body opening; a second resonant-tuned elongated body extending through an opening in the one or more damper elements in the second body opening, wherein the second resonant-tuned elongated body is configured to resonate at a second predefined resonant frequency, whereby the second resonant-tuned elongated body generates a force against the one or more damper elements in the second body opening; and wherein each of the one or more damper elements in the second body opening has a surface in contact with at least one of the second body opening and the second resonant-tuned elongated body.

Another aspect of the disclosure includes any of the preceding aspects, and the first predefined resonant frequency matches a resonant frequency of the turbine component at the first body opening.

Another aspect includes a turbine component, comprising: a body having a first body opening defined therein; and a vibration dampening system for dampening vibrations in the body and configured to be installed in the first body opening, the vibration dampening system including: one or more damper elements in the first body opening; a first resonant-tuned elongated body extending through an opening in the one or more damper elements in the first body opening, wherein the first resonant-tuned elongated body is configured to resonate at a first predefined resonant frequency, whereby the first resonant-tuned elongated body generates a force against the one or more damper elements in the first body opening; and wherein each of the one or more damper elements in the first body opening has a surface in contact with at least one of the first body opening and the first resonant-tuned elongated body.

Another aspect of the disclosure includes any of the preceding aspects, and the first resonant-tuned elongated body includes at least one of the following characteristics of the first resonant-tuned elongated body selected to generate the first predefined resonant frequency during operation of the turbine component: a length, at least one outer dimension, an outer dimension taper along a length thereof, a wall thickness at at least one location, a material, at least one attachment location to the turbine blade, at least one attachment type to the turbine blade, and a number of the elongated bodies.

Another aspect of the disclosure includes any of the preceding aspects, and the one or more damper elements in the first body opening includes a plurality of damper elements stacked together along at least some portion of the first resonant-tuned elongated body.

Another aspect of the disclosure includes any of the preceding aspects, and the one or more damper elements in the first body opening are selected from a group comprising: a damper pin, a damper element having flexible legs, a spring-suspended damper element, a nested damper pin, a plate member with an opening, a helical metal ribbon spring, and a wire mesh.

Another aspect of the disclosure includes any of the preceding aspects, and the one or more damper elements in the first body opening includes a first plurality of stacked washers having a first outer dimension and a second plurality of stacked washers having a second outer dimension, wherein the first outer dimension and the second outer dimension are different.

Another aspect of the disclosure includes any of the preceding aspects, and the first outer dimension matches an inner dimension of the first body opening, and the second outer dimension is smaller than the inner dimension of the first body opening.

Another aspect of the disclosure includes any of the preceding aspects, and the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

Another aspect of the disclosure includes any of the preceding aspects, and the turbine component includes a second body opening, and the vibration dampening system further comprises: one or more damper elements in the second body opening; a second resonant-tuned elongated body extending through an opening in the one or more damper elements in the second body opening, wherein the second resonant-tuned elongated body is configured to resonate at a second predefined resonant frequency, whereby the second resonant-tuned elongated body generates a force against the one or more damper elements in the second body opening; and wherein each of the one or more damper elements in the second body opening has a surface in contact with at least one of the second body opening and the first resonant-tuned elongated body.

Another aspect of the disclosure includes any of the preceding aspects, and the first predefined resonant frequency matches a resonant frequency of the turbine component at the first body opening.

Another aspect includes a method, comprising: selecting a frequency of concern for a turbine component in operation at a body opening defined therein; configuring a resonant-tuned elongated body to be positioned in the body opening to have a resonant frequency that is same as the frequency of concern of the turbine component at the body opening; positioning the resonant-tuned elongated body through an opening in one or more damper elements; and positioning the resonant-tuned elongated body with the one or more damper elements in the body opening, wherein the one or more damper elements in the body opening has a surface in contact with at least one of the body opening and the resonant-tuned elongated body.

Another aspect of the disclosure includes any of the preceding aspects, and the configuring the resonant-tuned elongated body includes selecting at least one of the following characteristics of the resonant-tuned elongated body selected to match a resonant frequency of the resonant-tuned elongated body with a resonant frequency of the turbine component at the body opening: a length, at least one outer dimension, an outer dimension taper along a length thereof, a wall thickness at at least one location, a material, at least one attachment location to the turbine blade, at least one attachment type to the turbine blade, and a number of the elongated bodies.

Another aspect of the disclosure includes any of the preceding aspects, and the one or more damper elements are selected from a group comprising: a damper pin, a damper element having flexible legs, a spring-suspended damper element, a nested damper pin, a plate member with an opening, a helical metal ribbon spring, and a wire mesh.

Another aspect of the disclosure includes any of the preceding aspects, and the one or more damper elements includes a first plurality of stacked washers having a first outer dimension and a second plurality of stacked washers having a second outer dimension, wherein the first outer dimension and the second outer dimension are different.

Another aspect of the disclosure includes any of the preceding aspects, and the first outer dimension matches an inner dimension of the first body opening, and the second outer dimension is smaller than the inner dimension of the first body opening.

Another aspect of the disclosure includes any of the preceding aspects, and the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
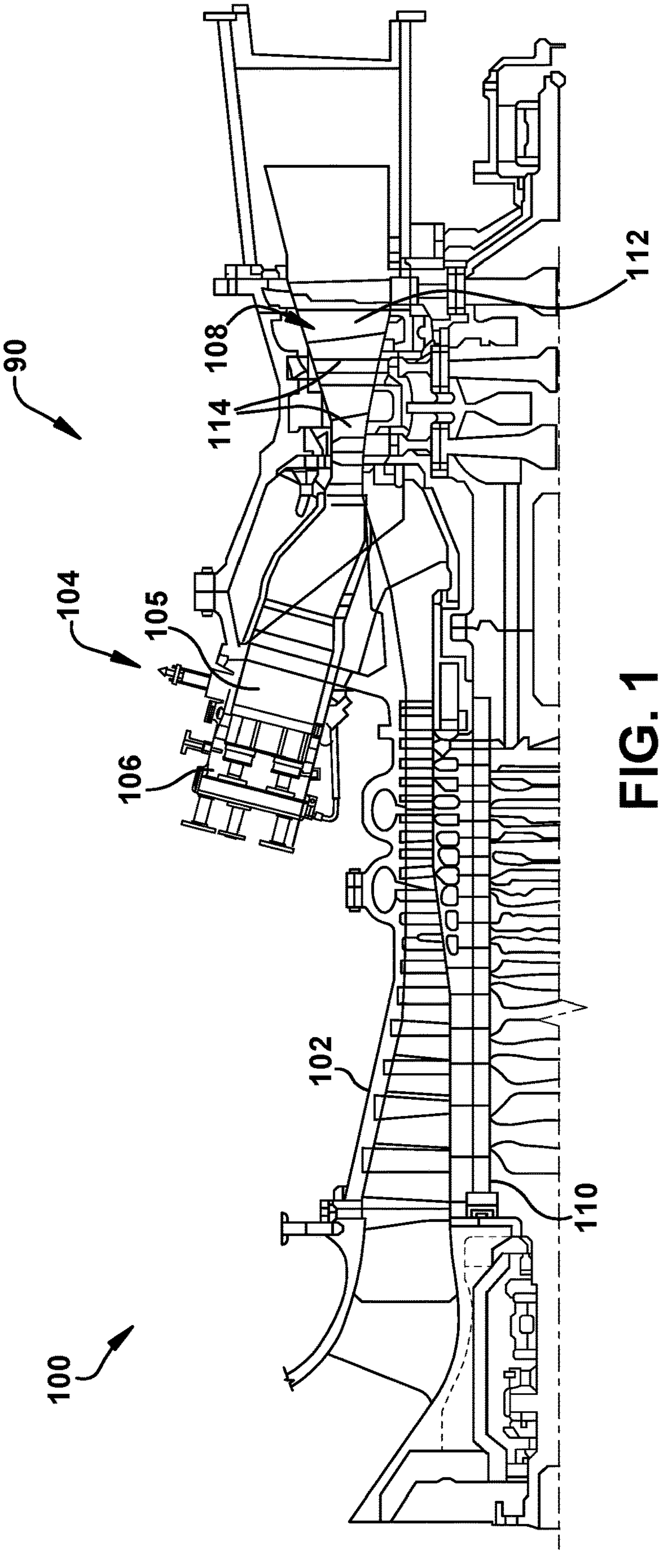
FIG. 1 shows a cross-sectional view of an illustrative turbomachine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, “downstream” and “upstream” are terms that indicate a direction relative to the flow of a fluid, such as the working fluid through the turbomachine or, for example, the flow of air through the combustor or coolant through one of the turbomachine’s component systems. The term “downstream” corresponds to the direction of flow of the fluid, and the term “upstream” refers to the direction opposite to the flow. The terms “forward” and “aft,” without any further specificity, refer to directions, with “forward” referring to the front or compressor end of the turbomachine, and “aft” referring to the rearward or turbine end of the turbomachine.

It is often required to describe parts that are at different radial positions with regard to a center axis. The term “axial” refers to movement or position parallel to an axis, e.g., an axis of a turbomachine. The term “radial” refers to movement or position perpendicular to an axis, e.g., an axis of a turbomachine. In cases such as this, if a first component resides closer to the axis than a second component, it will be stated herein that the first component is “radially inward” or “inboard” of the second component. If, on the other hand, the first component resides further from the axis than the second component, it may be stated herein that the first component is “radially outward” or “outboard” of the second component. Finally, the term “circumferential” refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms “first,” “second,” and “third,” may be used interchangeably to distinguish one component from another and are not intended to signify location or importance of the individual components.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. “Optional” or “optionally” means that the subsequently described event may or may not occur or that the subsequently described feature may or may not be present and that the description includes instances where the event occur or the feature is present and instances where the event does not occur or the feature is not present.

Where an element or layer is referred to as being “on,” “engaged to,” “connected to,” “coupled to,” or “mounted to” another element or layer, it may be directly on, engaged, connected, coupled, or mounted to the other element or layer, or intervening elements or layers may be present. In contrast, when an element is referred to as being “directly on,” “directly engaged to,” “directly connected to,” or “directly coupled to” another element or layer, there are no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items. The verb forms of “couple” and “mount” may be used interchangeably herein.

Embodiments of the disclosure include a vibration dampening system including damper element(s) in a body opening of a turbine component. A resonant-tuned elongated body extends through the damper element(s) in the body opening. The resonant-tuned elongated body is configured to resonate at a predefined resonant frequency to generate a force against the damper element(s) in the body opening. The damper element(s) have a surface in contact with the body opening and/or resonant-tuned elongated body. The resonant-tuned elongated body can be configured to resonate at the predefined resonant frequency, e.g., resonant frequency where located, by changing a wide variety of material and/or geometric characteristics thereof. The vibration dampening system provides customized vibration dampening at one or more locations of body internal openings in a body of a turbine component, leading to improved vibration dampening of the turbine component. The vibration dampening system reduces turbine component, e.g., nozzle or blade, vibration with a simple arrangement and does not add much extra mass to the turbine component. Accordingly, the vibration dampening system and damper element(s) do not increase centrifugal force to the turbine component or require a change in component configuration.

Referring to the drawings, FIG. 1 is a cross-sectional view of an illustrative machine including a turbine(s) to which teachings of the disclosure can be applied. In FIG. 1, a turbomachine 90 in the form of a combustion turbine or gas turbine (GT) system 100 (hereinafter, “GT system 100”) is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as “rotor 110”).

GT system 100 may be, for example, a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
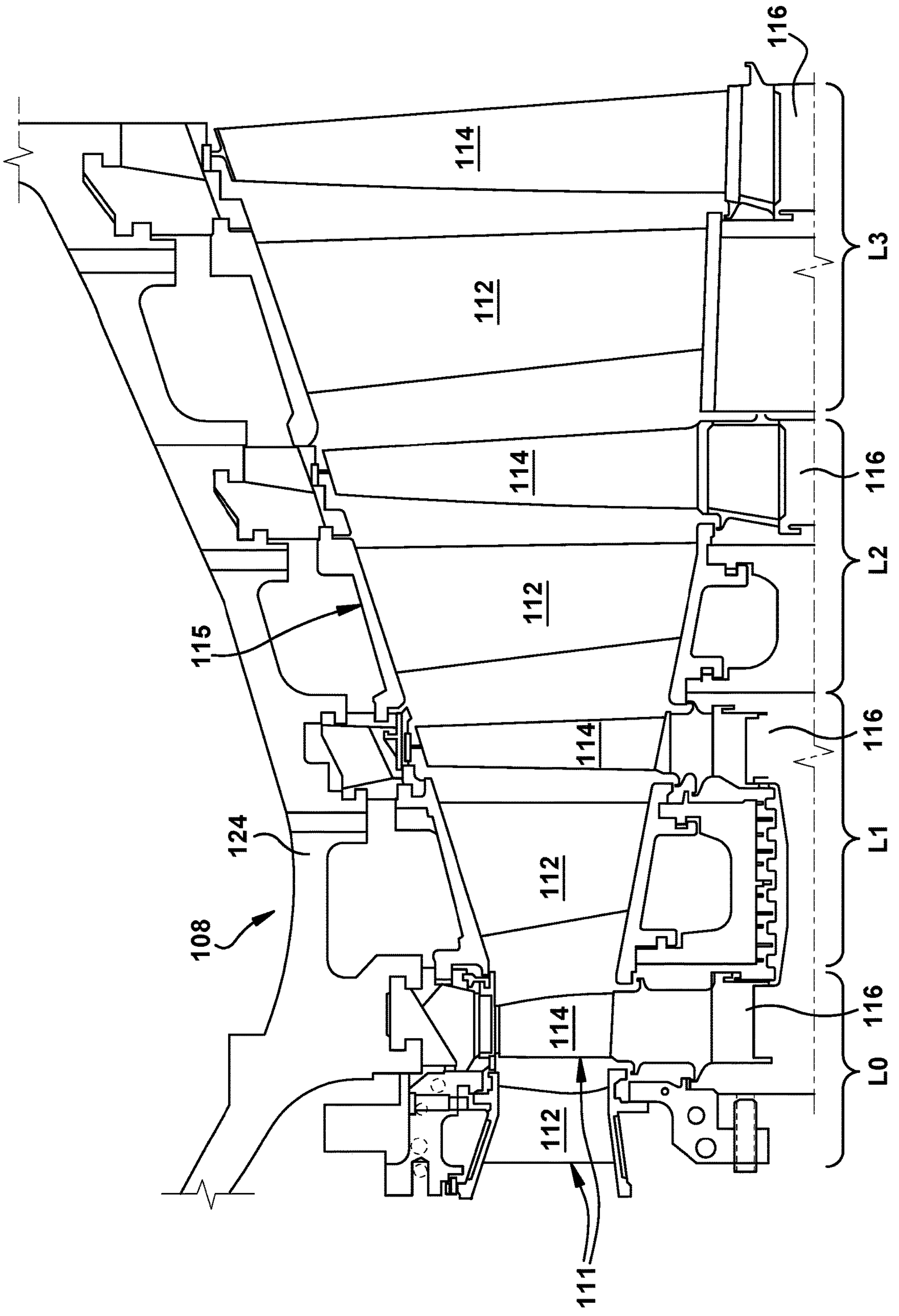
FIG. 2 shows a cross-sectional view of a portion of an illustrative turbine, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

For purposes of description, a turbine component 111 that teachings of the disclosure can be applied to may be provides as a turbine stationary nozzle 112 or rotating blade 114. The teachings of the disclosure can be applied to a variety of other turbine parts also. A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of nozzles 112 mounted to a casing 124 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 may also be rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
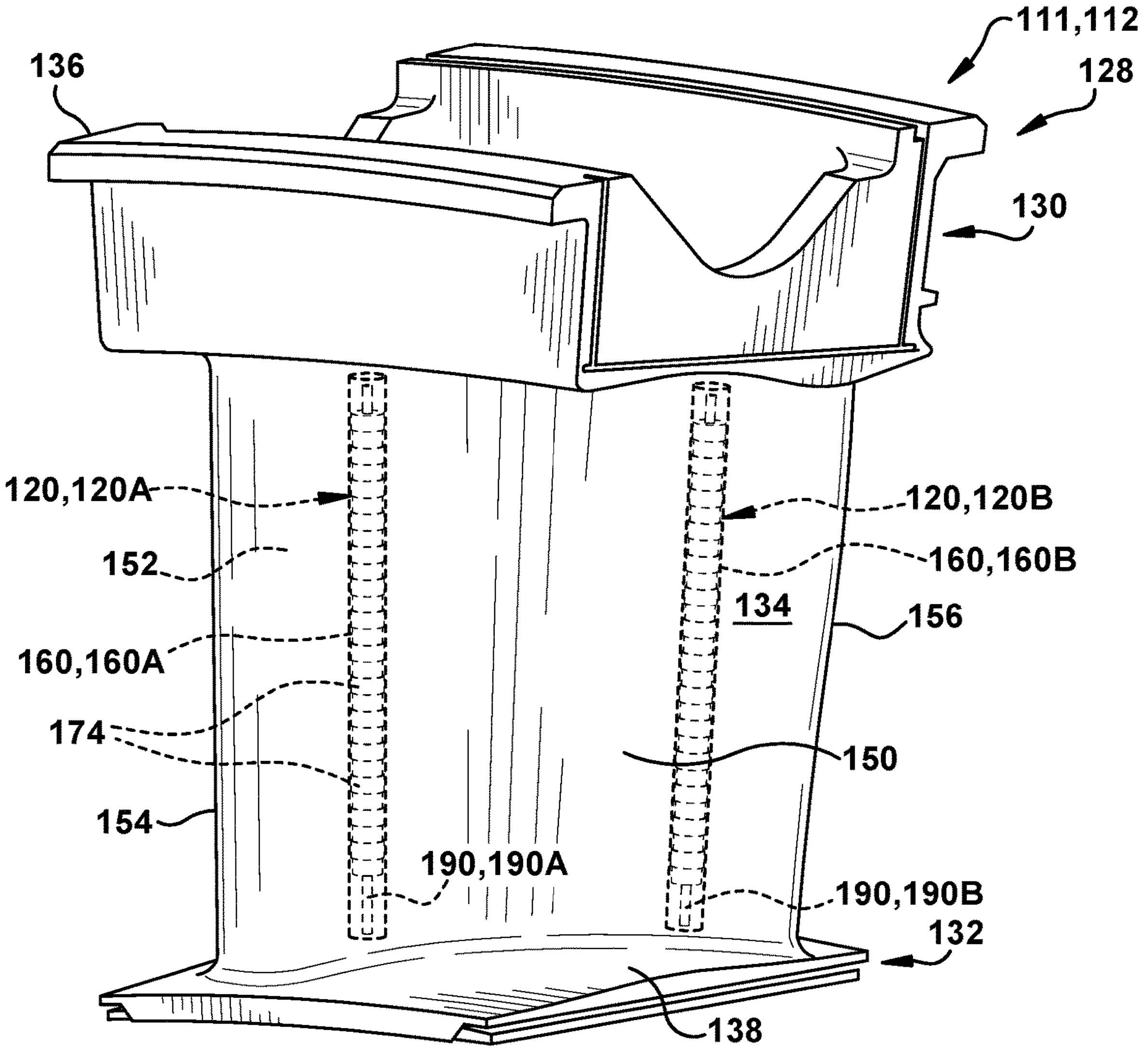
FIG. 3 shows a perspective view of an illustrative turbine component in the form of a turbine nozzle including a vibration dampening system, according to embodiments of the disclosure.
Figure 4:
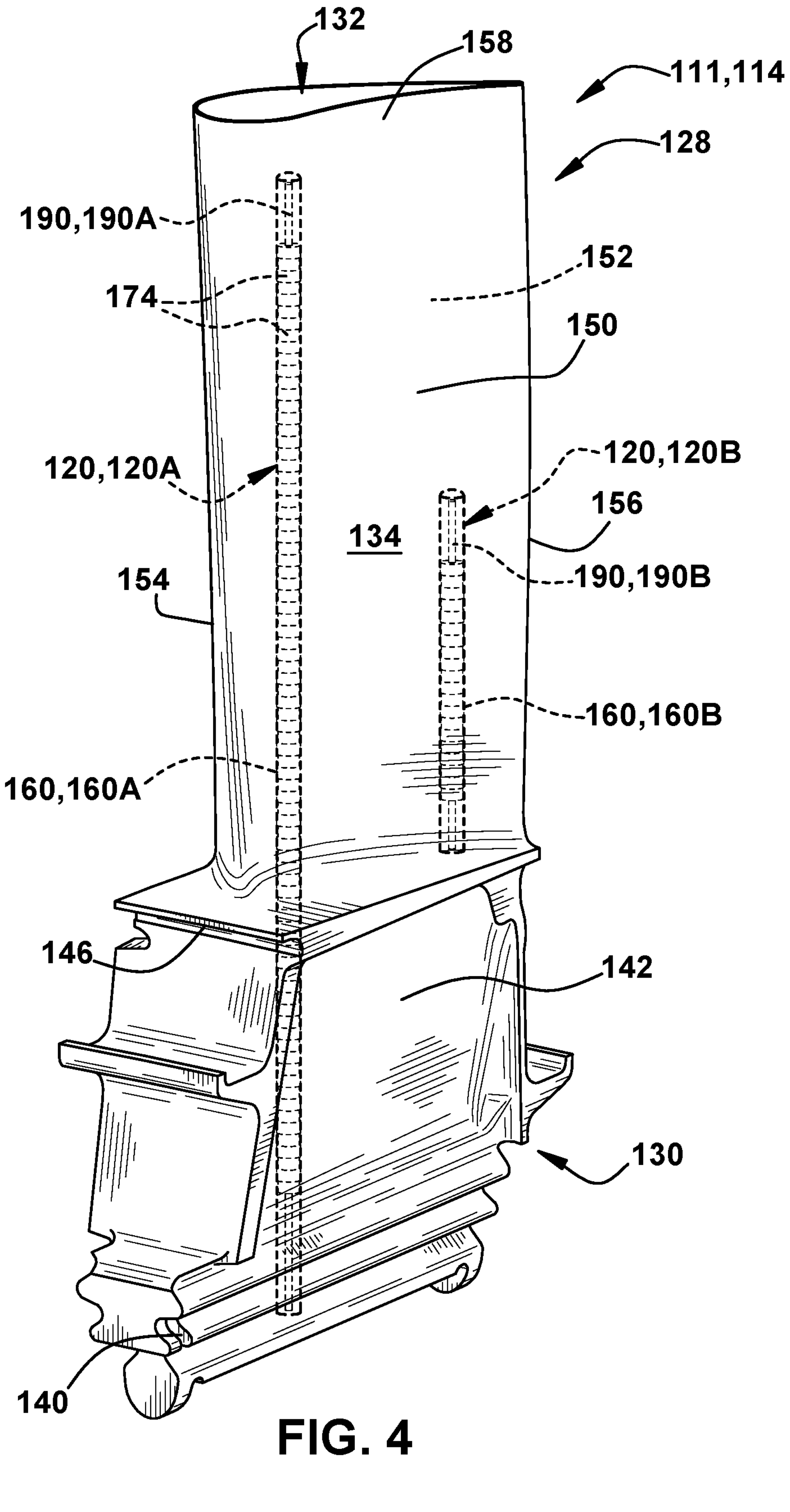
FIG. 4 shows a perspective view of an illustrative turbine component in the form of a turbine blade including a vibration dampening system, according to embodiments of the disclosure.
Figure 5:
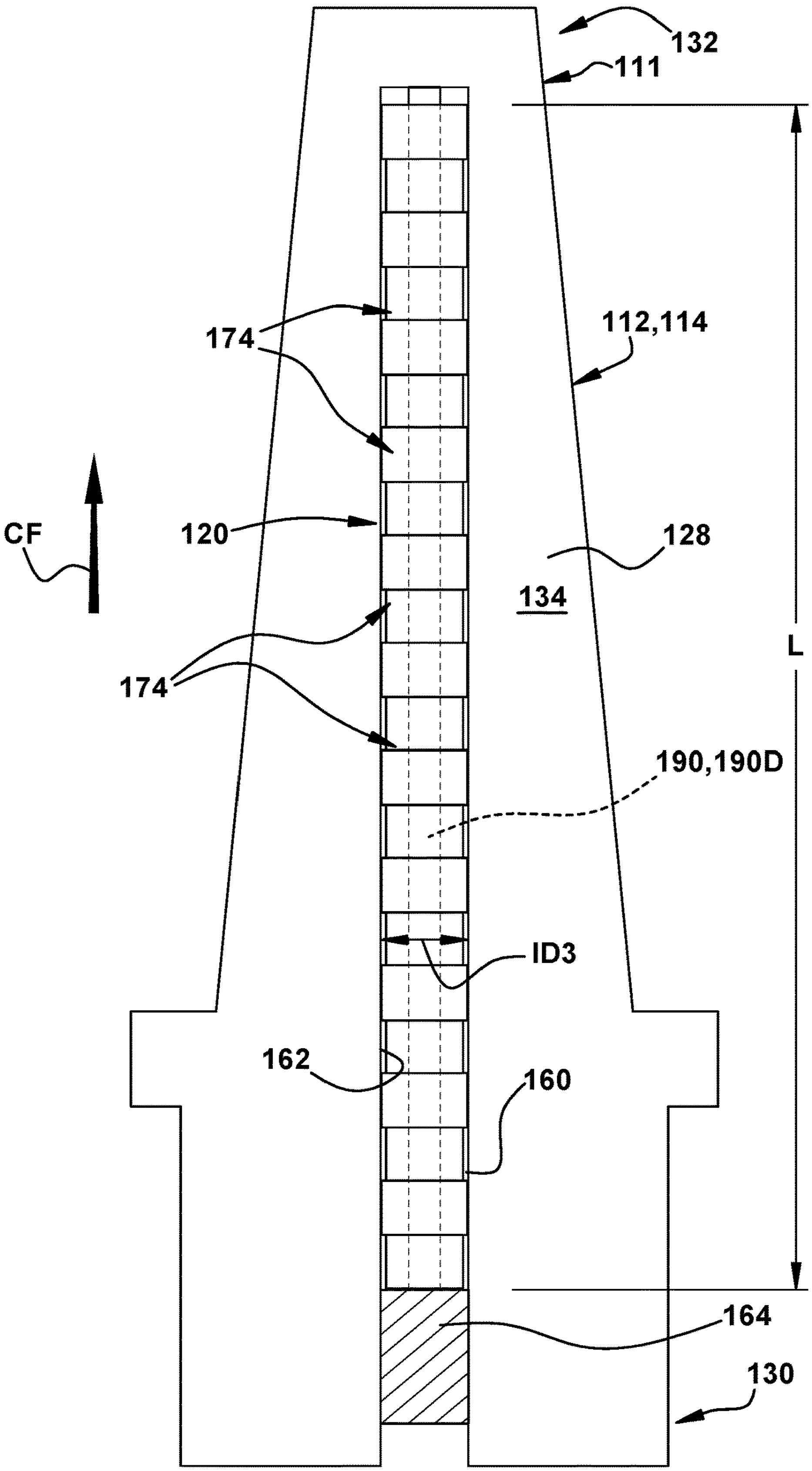
FIG. 5 shows a schematic cross-sectional view of a turbine component, such as a turbine nozzle or blade, having a vibration dampening system, according to embodiments of the disclosure.
Figure 6:
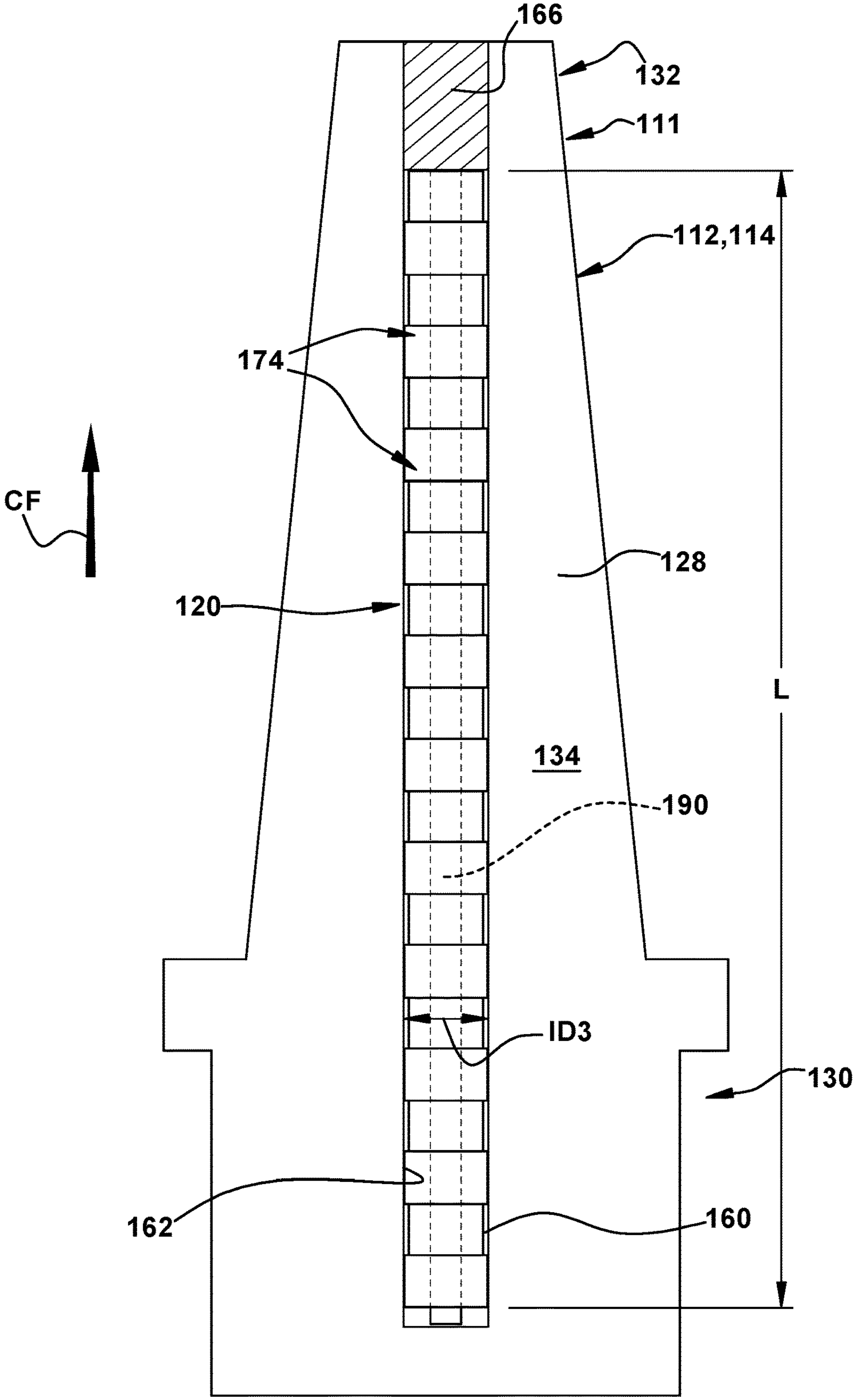
FIG. 6 shows a schematic cross-sectional view of a turbine component, such as a turbine nozzle or blade, having a vibration dampening system, according to embodiments of the disclosure.

FIGS. 3 and 4 show perspective views, respectively, of a (stationary) nozzle 112 and a (rotating) blade 114, of the type in which embodiments of a vibration dampening system 120 of the present disclosure may be employed. As will be described herein, FIGS. 5 and 6 show schematic cross-sectional views of a nozzle 112 or blade 114 including vibration dampening system 120, according to various embodiments of the disclosure.

Referring to FIGS. 3 and 4, each turbine component, e.g., nozzle 112 or blade 114, includes a body 128. In terms of nozzles or blades, body 128 has a base end 130, a tip end 132, and an airfoil 134 extending between base end 130 and tip end 132. As shown in FIG. 3, nozzle 112 includes an outer endwall 136 at base end 130 and an inner endwall 138 at tip end 132. Outer endwall 136 couples to casing 124 (FIG. 2). As shown in FIG. 4, blade 114 includes a dovetail 140 at base end 130 by which blade 114 attaches to a rotor wheel 116 (FIG. 2) of rotor 110 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in nozzle 112 and blade 114 is the active component of the nozzle 112 or blade 114 that intercepts the flow of working fluid and, in the case of blades 114, induces rotor 110 (FIG. 1) to rotate. It will be seen that airfoil 134 of nozzle 112 and blade 114 include a concave pressure side (PS) outer sidewall 150 and a circumferentially or laterally opposite convex suction side (SS) outer sidewall 152 extending axially between opposite leading and trailing edges 154, 156, respectively. Sidewalls 150 and 152 also extend in the radial direction from base end 130 (i.e., outer endwall 136 for nozzle 112 and platform 146 for blade 114) to tip end 132 (i.e., inner endwall 138 for nozzle 112 and a tip end 158 for blade 114). Note, in the example shown, blade 114 does not include a tip shroud; however, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades, among other turbine components.

During operation of a turbine, nozzles 112 or blades 114 may be excited into vibration by a number of different forcing functions. For example, variations in working fluid temperature, pressure, and/or density can excite vibrations throughout the rotor assembly, especially within the airfoils and/or tips of the blades 114 or nozzles 112. Gas exiting upstream of the turbine and/or compressor sections in a periodic (or "pulsating") manner can also excite undesirable vibrations. Embodiments of the present disclosure reduce the vibration of a stationary nozzle 112 or rotating turbine blade 114 without significant change of nozzle or blade design. Other turbine components 111 may also experience similar vibrations and can benefit from the teachings of the disclosure.

FIGS. 5 and 6 each show a schematic cross-sectional view of a turbine component 111, e.g., a turbine nozzle 112 or blade 114, including vibration dampening system 120 according to embodiments of the disclosure. (Nozzle 112 in the schematic cross-sectional views of FIGS. 5-6 is shown flipped vertically compared to that shown in FIG. 3 and without inner endwall 138, for ease of description. It should be understood that references to base end 130 and tip end 132 may be reversed for nozzle 112, as compared to blade 114.) Vibration dampening system 120 is for dampening vibrations in body 128 of turbine component 111 and is configured to be installed in a body opening or internal opening 160 in body 128. Any number of vibration dampening systems 120 can be used in a turbine component 111, i.e., with multiple body openings 160. Vibration dampening system 120 for turbine component 111, e.g., nozzle 112 or blade 114, may also include a body opening or internal opening 160 extending through body 128 of turbine component 111. In the example shown, body opening 160 extends at least partially between tip end 132 and base end 130 thereof and through airfoil 134. Body opening 160 may extend part of the distance between base end 130 and tip end 132, or it may extend through one or more of base end 130 or tip end 132. Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128, but this may not be necessary in all cases. For example, some angling, and perhaps curving, of body opening 160 relative to a radial extent of body 128 is possible, and/or body opening 160 may not extend radially in all turbine components 111. Body opening 160 has an inner surface 162.

As shown in FIG. 5, body opening 160 may originate at base end 130 of nozzle 112 or blade 114, or, as shown in FIG. 6, it may originate at tip end 132 of nozzle 112 or blade 114. More particularly, as shown in FIG. 5, body opening 160 may be open in base end 130 and terminate in tip end 132, or, as shown in FIG. 6, it may be open in tip end 132 and terminate in base end 130. The open end may assist in assembly of vibration dampening system 120 in nozzle 112 or blade 114 and may allow retrofitting of the system into an existing nozzle or blade. Where body opening 160 extends through base end 130 as shown in FIG. 5, a closure member 164 for closing body opening 160 may be provided. Where body opening 160 extends through tip end 132, as shown in FIG. 6, a closure member 166 for body opening 160 may be provided. In addition to closing body opening 160, closure members 164, 166 prevent removal of vibration dampening system 120 from body opening 160. Closure members 164, 166 may also optionally be used to mount a resonant-tuned elongated body 190 according to embodiments of the disclosure.

The FIGS. 5 and 6 drawing schematic cross-sectional format will be used periodically in the drawings to illustrate how certain vibration dampening systems 120 can be used in a nozzle 112 or blade 114 facing in different radial directions. As will be further described, some forms of vibration dampening systems 120 are only applicable to turbine blades 114 or other turbine components 111 that experience centrifugal force, i.e., in a radial outward direction.

Figure 7:
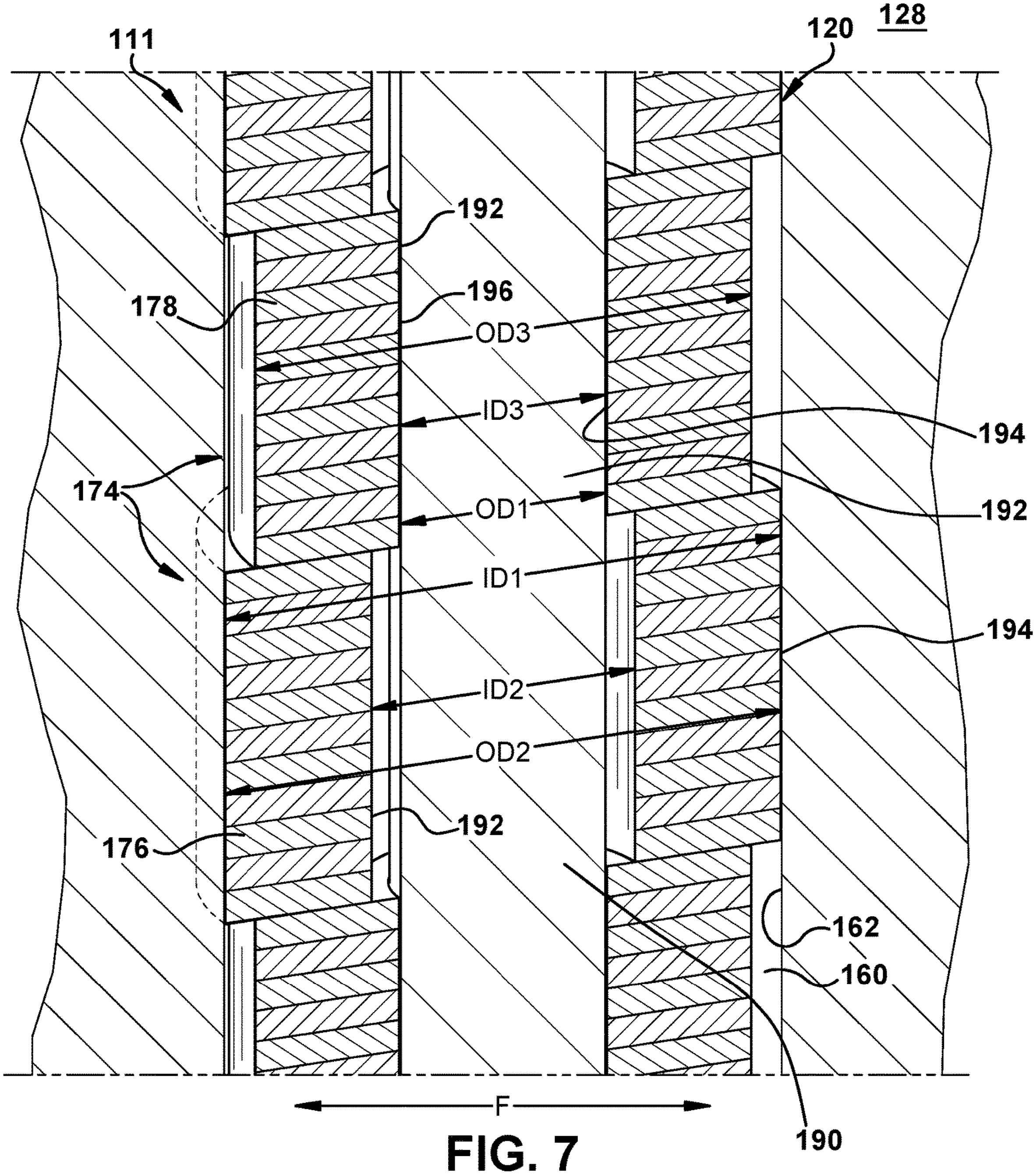
FIG. 7 shows an enlarged cross-sectional view of damper elements of FIGS. 5-6, according to embodiments of the disclosure.

Vibration dampening system 120 for turbine component 111, e.g., nozzles 112 or blades 114, may include one or more damper elements 174 in body opening 160. Damper element(s) 174 can be stacked together. As will be described further herein, damper element(s) 174 can take a large variety of forms. For purposes of description relative to FIGS. 5 and 6, and as shown in FIG. 7, damper element(s) 174 in body opening 160 may include a first plurality of stacked washers 176 and a second plurality of stacked washers 178. Each "washer" includes a plate member having an opening 192 therein. Washers 176, 178 may have circular outer edges, but this is not necessary in all cases.

Vibration dampening system 120 for turbine component 111, e.g., nozzles 112 or blades 114, also includes a resonant-tuned elongated body 190 extending through an opening 192 in damper element(s) 174 in body opening 160. Resonant-tuned elongated body 190 (hereafter "RTE body 190") is configured to resonate at predefined resonant frequency. The "predefined resonant frequency" as used herein may be any frequency configured to address a frequency of concern in turbine component 111. The predefined resonant frequency may be, for example, a resonant frequency of turbine component 111 at body opening 160 during operation of turbine component 111, or a resonant frequency known to influence turbine component 111 at body opening 160 during operation. The latter example may include but is not limited to a frequency just above or below the resonant frequency of turbine component 111 at body opening 160 during operation. RTE body 190 generates a force F against damper element(s) 174 in body opening 160. Body opening 160, i.e., inner surface 162, has an inner dimension ID1, and RTE body 190 has an outer dimension OD1.

As shown in FIG. 7, each of damper element(s) 174 in body opening 160 has a surface 194 in contact with at least one of body opening 160 and RTE body 190, respectively. More specifically, first plurality of stacked washers 176 has a first outer dimension OD2 and second plurality of stacked washers 178 has a second outer dimension OD3. First outer dimension OD2 and second outer dimension OD3 are different. First plurality of stacked washers 176 also has an inner dimension ID2 and second plurality of stacked washers 178 has an inner dimension ID3. Inner dimension ID2 of first plurality of stacked washer 176 and inner dimension ID3 of second plurality of stacked washers 178 are different. In certain embodiments, first outer dimension OD2 of first plurality of stacked washers 176 matches inner dimension ID1 of body opening 160, i.e., of inner surface 162 thereof, and second outer dimension OD3 of second plurality of stacked washers 178 is smaller than inner dimension ID1 of body opening 160. Hence, surface 194 of first plurality of stacked washers 176 contacts body opening 160. Inner dimension ID2 of first plurality of stacked washers 176 is larger than outer dimension OD1 of RTE body 190, and inner dimension ID3 of second plurality of stacked washer 178 matches outer dimension OD1 of RTE body 190. In this manner, an inner surface 196 of second plurality of stacked washers 178 contacts RTE body 190. Hence, each damper element(s) 174 in body opening 160 has surface 194 or 196 in contact with at least one of body opening 160 and RTE body 190, respectively. As used herein, "matches" means the stated dimensions are close to the same size or slightly smaller or larger to allow installation of the respective parts, e.g., washers 176 in body opening 160, or RTE body 190 through inner surface 196 of washers 178. As will be understood by those with skill in the art, the extent of "slightly smaller or larger" may vary depending on the tolerances required for installation.

Figure 8:
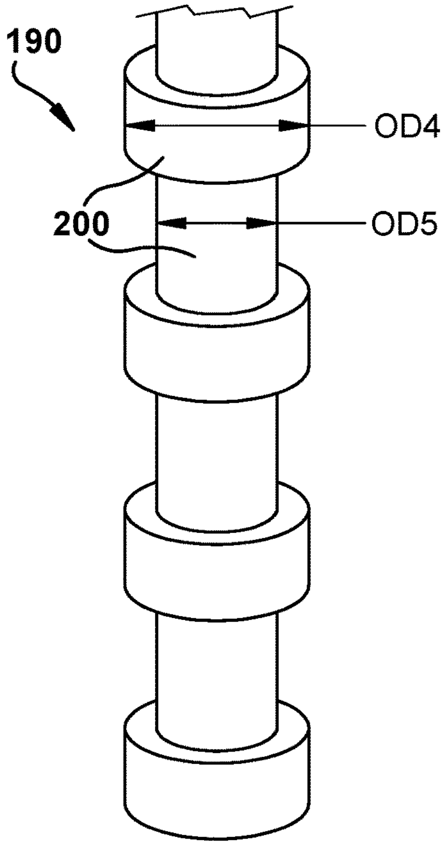
FIG. 8 shows a side view of a resonant-tuned elongated (RTE) body having different outer dimensions for a vibration dampening system, according to embodiments of the disclosure.
Figure 9:
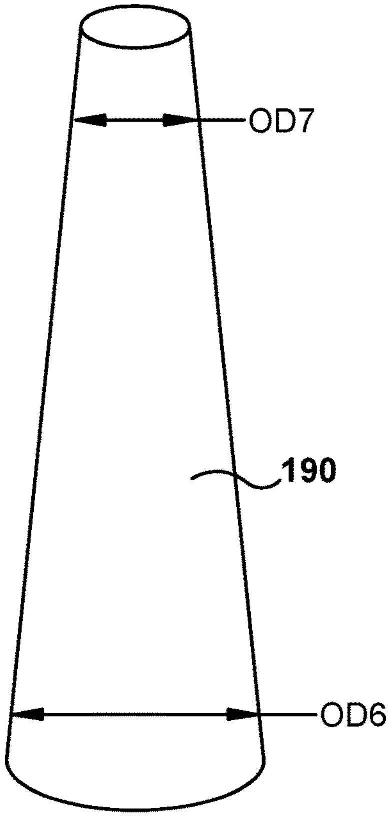
FIG. 9 shows a side view of an RTE body having a tapered outer dimension, according to embodiments of the disclosure.

RTE body 190 can be configured to match the predefined resonant frequency in a number of ways. More particularly, RTE body 190 includes at least one of the following characteristics thereof selected to generate the predefined resonant frequency in RTE body 190 during operation of turbine component 111: a material (e.g., mass, flex, hardness, etc.) and a length L (FIGS. 5-6). In addition, at least one outer dimension of RTE body 190 can be adjusted. In FIGS. 5-7, RTE body 190 has a single outer dimension OD1. However, as shown in FIG. 8, RTE body 190 may have sections 200 having different outer dimensions OD4, OD5. While two sections 200 are shown, RTE body 190 may have any number of sections 200 having different outer dimensions. As will be described further herein, sections 200 of different outer dimensions may also be used to retain damper elements 174 relative to RTE body 190. In another example, as shown in FIG. 9, an outer dimension taper along a length L of RTE body 190 may be selected to match the predefined resonant frequency of RTE body 190 with a resonant frequency of turbine component 111 at body opening 160. In this case, an outer dimension OD6 of RTE body 190 at one location is larger than an outer dimension OD7 of RTE 190 at another location such that the body tapers from one location to another, i.e., it is frusto-conical. The outer dimensions and/or the angle of taper can be adjusted to obtain the desire predefined resonant frequency.

Figure 10A:
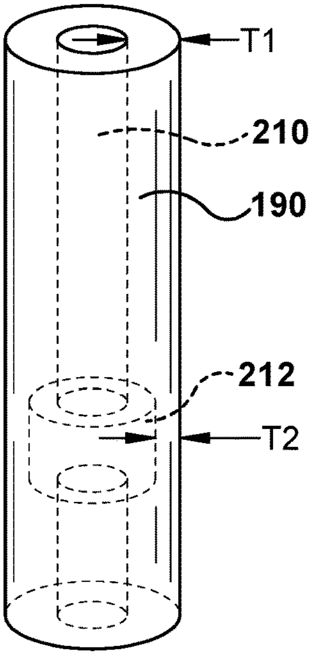
FIGS. 10A-B show side views of an RTE body having different wall thicknesses, according to embodiments of the disclosure.
Figure 10B:
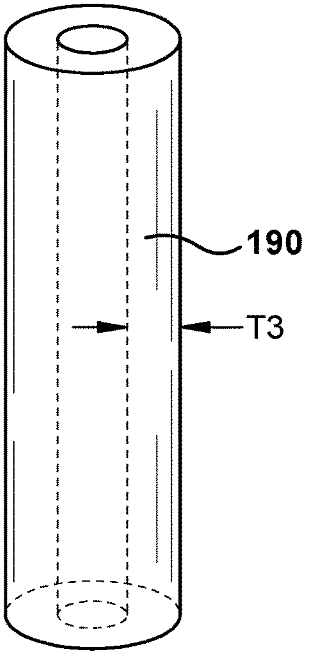

As shown in FIG. 10A, RTE body 190 may also include one or more hollow sections (two shown 210, 212 each with a wall thickness (T1, T2, respectively) at at least one location configured to adjust the resonant frequency of RTE body 190. That is, RTE body 190 may include one or more hollow sections 210, 212 with different wall thicknesses T1, T2. In another embodiment, shown in FIG. 10B, RTE body 190 may simply be tubular with a uniform wall thickness T3.

Figure 11:
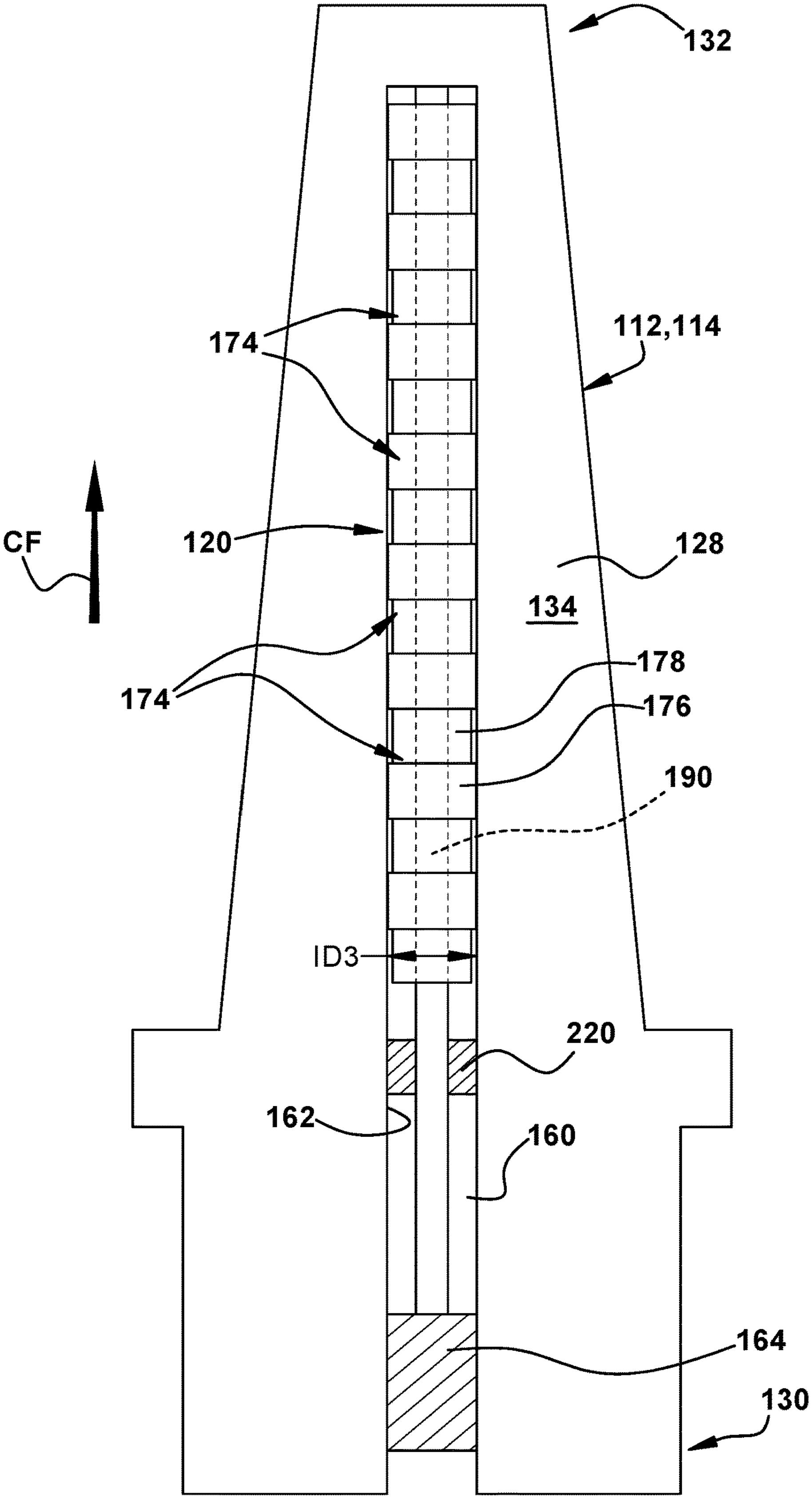
FIG. 11 shows a side view of an RTE body having an attachment point between ends thereof, according to embodiments of the disclosure.

As shown in FIGS. 5 and 6, in addition to geometric characteristics of RTE body 190, at least one attachment type to turbine component 111 can be adjusted. In FIGS. 5 and 6, RTE body 190 is fixedly coupled to base end 130 in FIG. 5 or at tip end 132 in FIG. 6, and an opposing end of RTE body 190 is free to vibrate. RTE body 190 may also be fixed at both ends. The type of attachment may include threaded fasteners, welding, clamping or other types of attachment, and may be selected to control the predefined resonant frequency. The length of RTE body 190 used in the attachment can also vary to control resonant frequency. In FIGS. 5 and 6, RTE body 190 has one attachment location to turbine component 111. However, as shown in FIG. 11, RTE body 190 may have more than one (additional) attachment location 220 with turbine component 111 to control its resonant frequency. In the example shown, RTE body 190 includes an attachment location 220, i.e., pinned location, between its ends to define the predefined resonant frequency. The form of attachment at location 220 can take any form that affects the vibration frequency of RTE body 190, i.e., a simple contact, fixed attachment (e.g., fastener, weld, etc.), among other options.

Damper element(s) 174 can take a large variety of forms other than shown in FIGS. 5-11. FIGS. 12-32 show alternative forms of damper element(s) 174. In certain embodiments, one or more damper elements 174 in body opening 160 include a plurality of damper elements 174 stacked together along at least some portion of RTE body 190. For example, FIGS. 5-7 show embodiments using a plurality of stacked damper elements 174 using different dimension stacked washers, i.e., damper element(s) 174 in body opening 160 may include a first plurality of stacked washers 176 and a second plurality of stacked washers 178. As will be further described herein, the one or more damper elements 174 in body opening 160 may be selected from a group comprising: a damper pin, a damper element having flexible legs (see FIGS. 21-22), a spring-suspended damper element (see FIGS. 17-20), a nested damper pin (see FIGS. 23-24), a plate member with an opening (e.g., flat or curved washers, see FIGS. 5-7, 12-15), a helical metal ribbon spring (see FIG. 16), and a wire mesh (see FIGS. 25-32).

Figure 12:
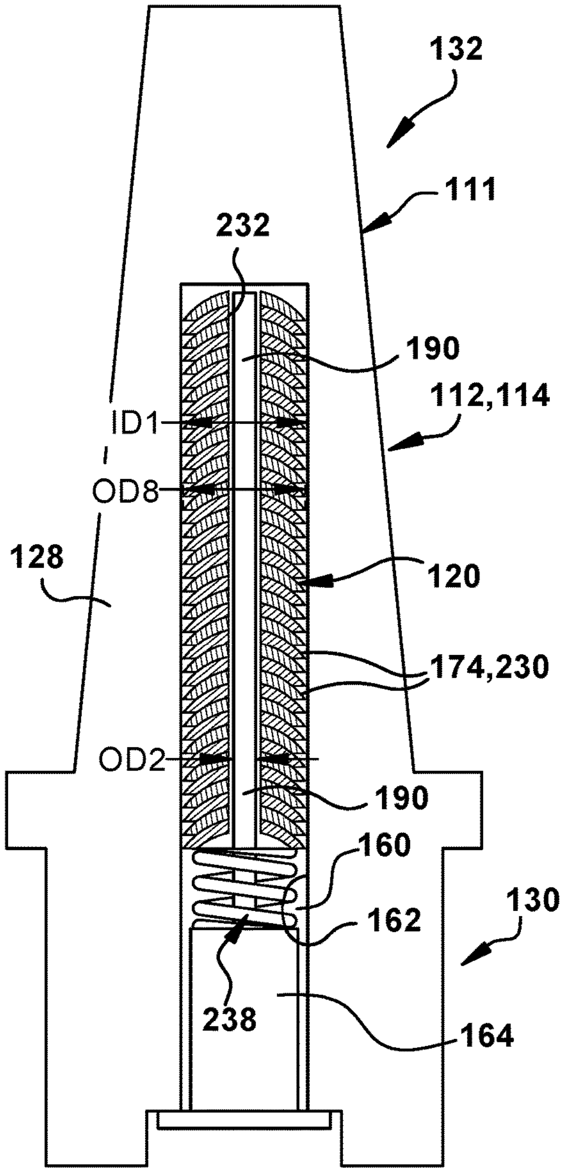
FIG. 12 shows a schematic cross-sectional view of a turbine component having a vibration dampening system including a plurality of damper elements including stacked plate members around an RTE body, according to other embodiments of the disclosure.
Figure 13:
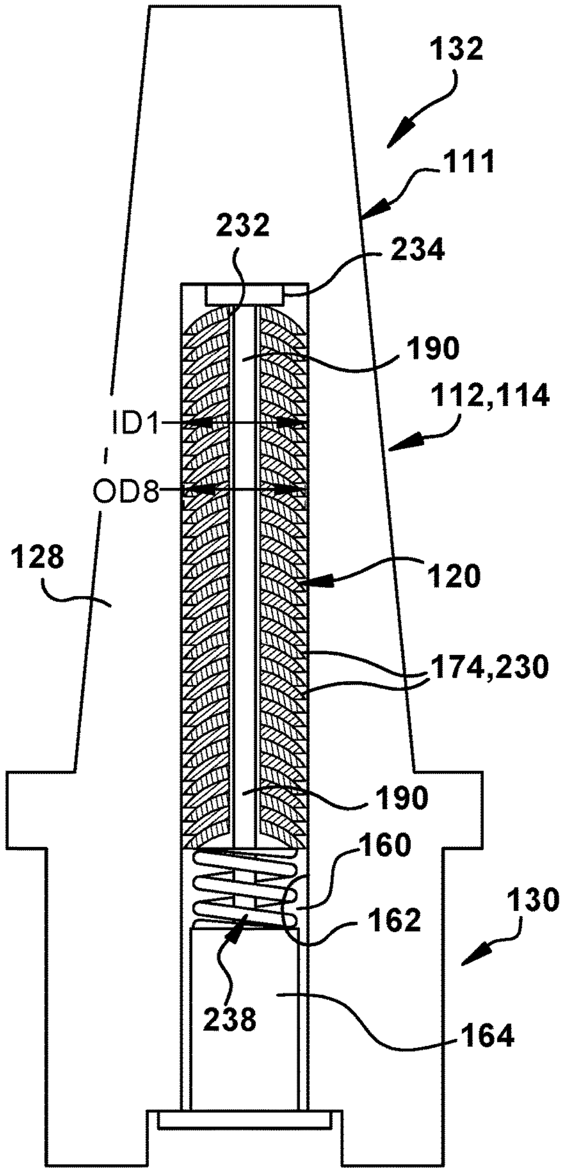
FIG. 13 shows a schematic cross-sectional view, similar to FIG. 12, but including a retainer on an RTE body, according to other embodiments of the disclosure.
Figure 14:
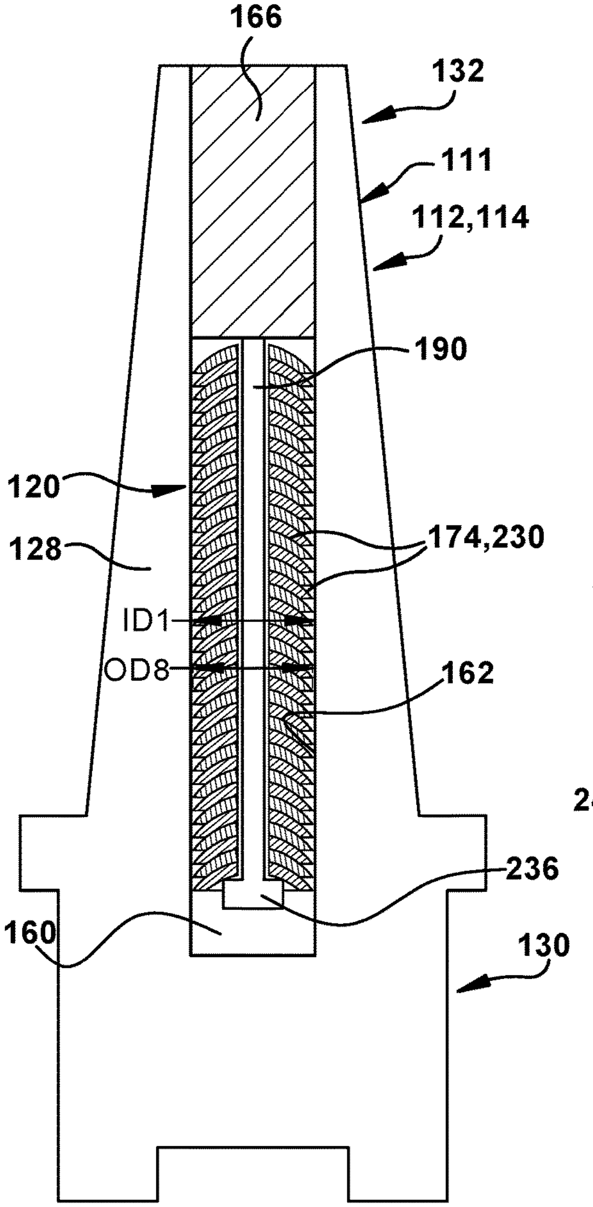
FIG. 14 shows a schematic cross-sectional view of a turbine component having a vibration dampening system including a plurality of damper elements including stacked plate members around an RTE body, according to additional embodiments of the disclosure.
Figure 15:
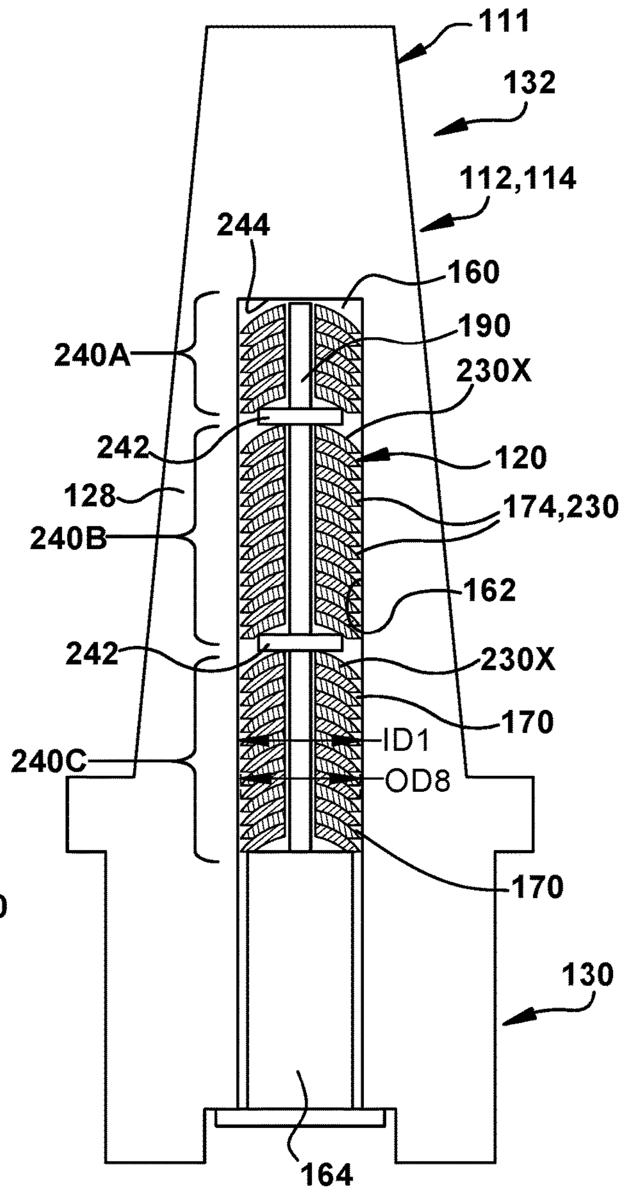
FIG. 15 shows a schematic cross-sectional view of a turbine component having a vibration dampening system including grouped, stacked damper elements (plate members) around an RTE body, according to additional embodiments of the disclosure.

FIG. 12 shows a schematic cross-sectional view of turbine component 111 including a vibration dampening system 120 using an RTE body 190 with stacked damper elements 174 in the form of stacked plate members 230 with openings 232 therein, i.e., washers. (Plate members 230 in FIGS. 12-15 are similar to those in FIGS. 5-7 except plate members 230 are concave/convex and have the same outer dimension OD7 that matches an inner dimension ID1 of body opening 160). Plurality of stacked plate member(s) 230 may be retained in position or limited in movement. For example, retention members 234 (FIG. 13), 236 (FIG. 14), 242 (FIG. 15) on RTE body 190 may be used to restrain plate members 230. Hence, in accordance with embodiments of the disclosure, retention member 234, 236, 242 on RTE body 190 may be used to retain plate members 230 relative to a length of RTE body 190 and/or control the predefined resonant frequency of RTE body 190 in an operative state in body opening 160 of turbine component 111. A compression member 238, e.g., a spring or other flexible member or a weight, may be used to apply pressure to plate members 230. FIG. 15 shows a cross-sectional view of another embodiment in which plurality of stacked plate members 230 are separated into at least two groups 240. In FIG. 15, three groups 240A-C are shown, but any number of groups can be used. A retention member 242 on RTE body 190 engages with an endmost plate member 230X of each group 240A-C to prevent the respective group from moving relative to a length of RTE body 190. End 244 of body opening 160 may retain group 240A closest to tip end 132, or another retainer (similar to 242 but not shown) can be used. Any number of groups 240 with each group including any number of plate members 230 can be used to provide the desired vibration dampening.

Figure 16:
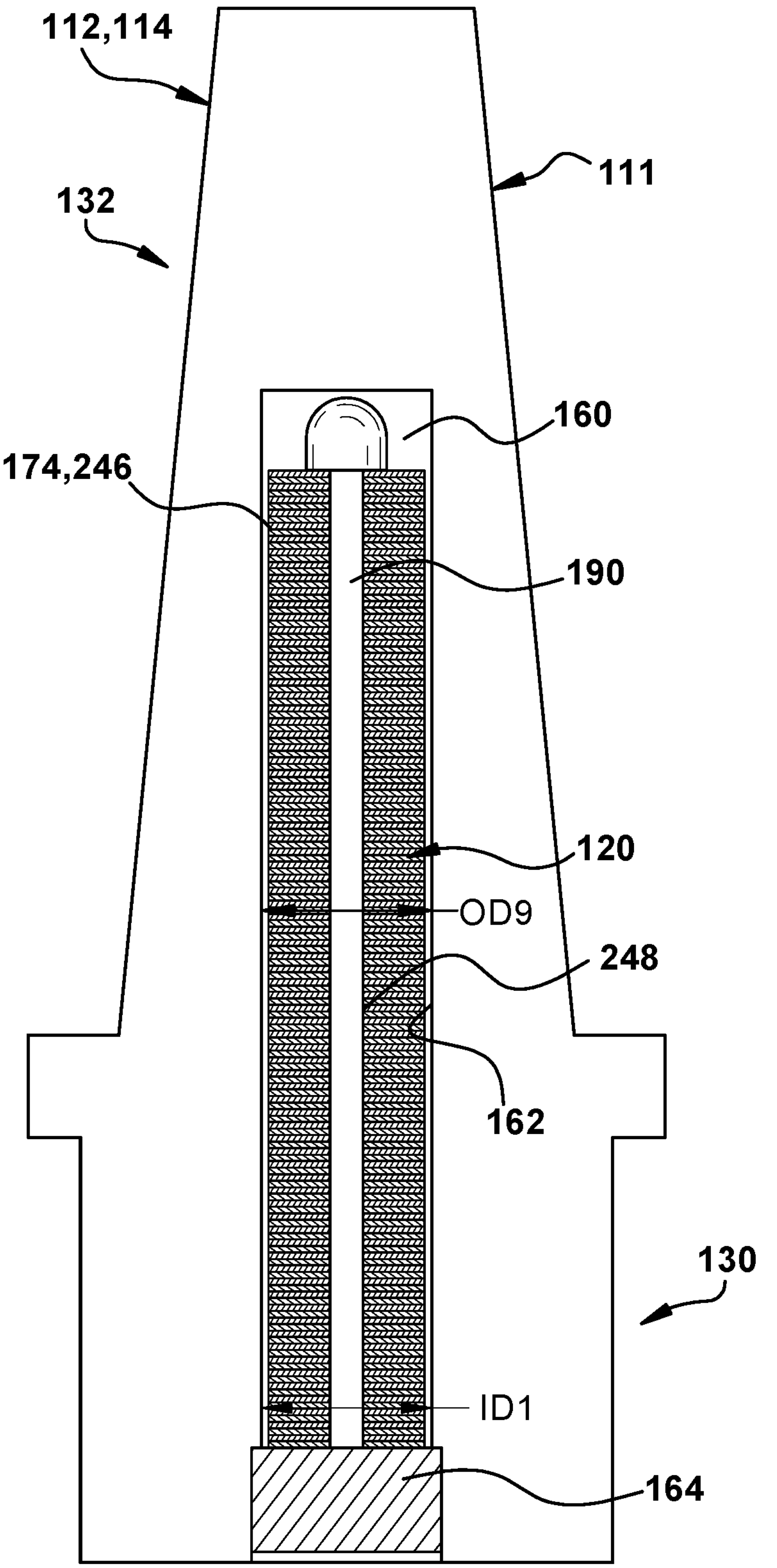
FIG. 16 shows a schematic cross-sectional view of a turbine component having a vibration dampening system including a vibration dampening element including a helical metal ribbon spring around and RTE body, according to other embodiments of the disclosure.

FIG. 16 shows a schematic cross-sectional view of turbine component 111 including a vibration dampening system 120 using an RTE body 190 with a damper element 174 in the form of a helical metal ribbon spring 246 with opening 248 therein. Helical metal ribbon spring 246 may have a uniform outer dimension OD8 that matches inner dimension ID1 of body opening 160.

Figure 17:
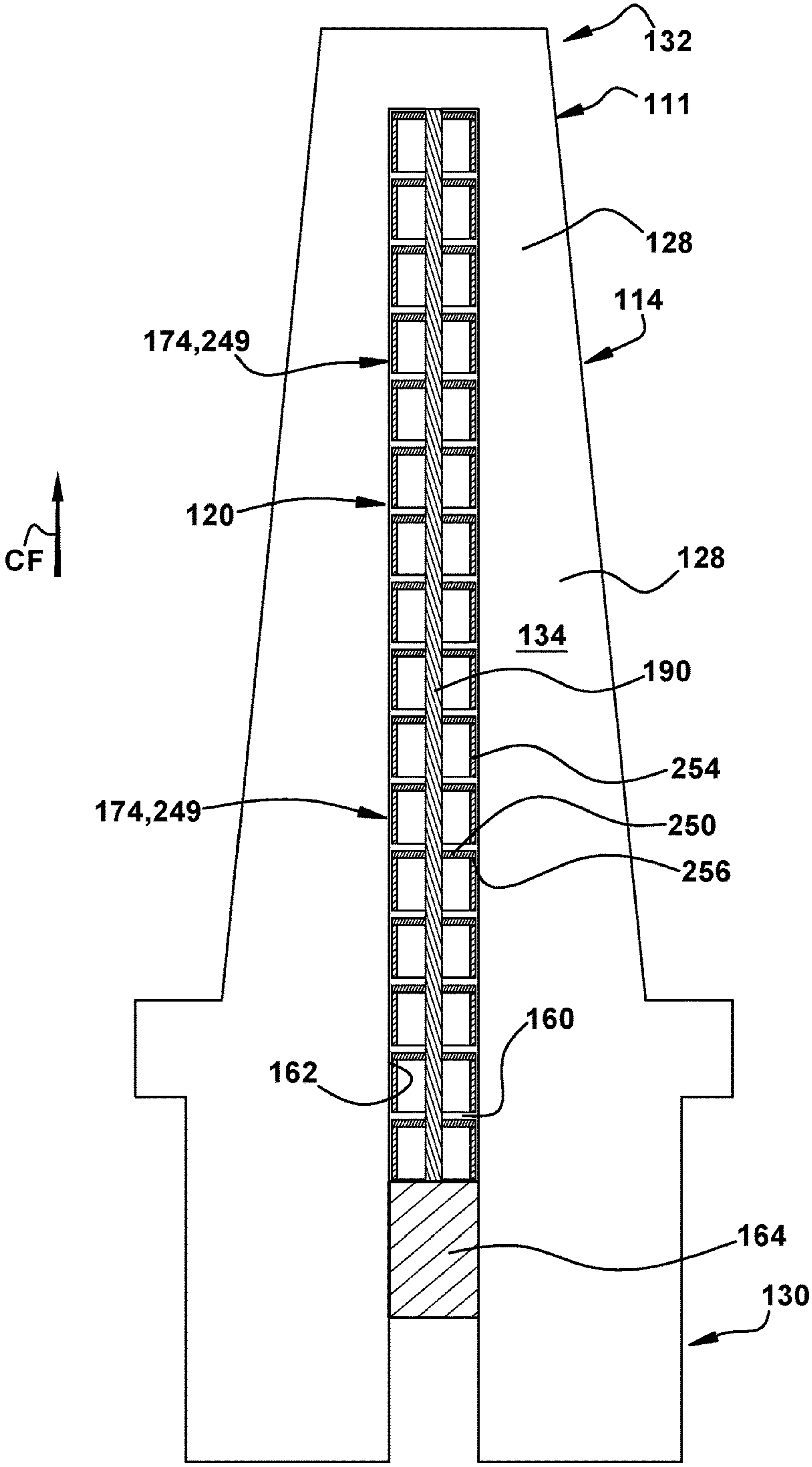
FIG. 17 shows a schematic cross-sectional view of a turbine blade having a vibration dampening system including a plurality of spring-suspended damper elements around an RTE body, according to embodiments of the disclosure.
Figure 18:
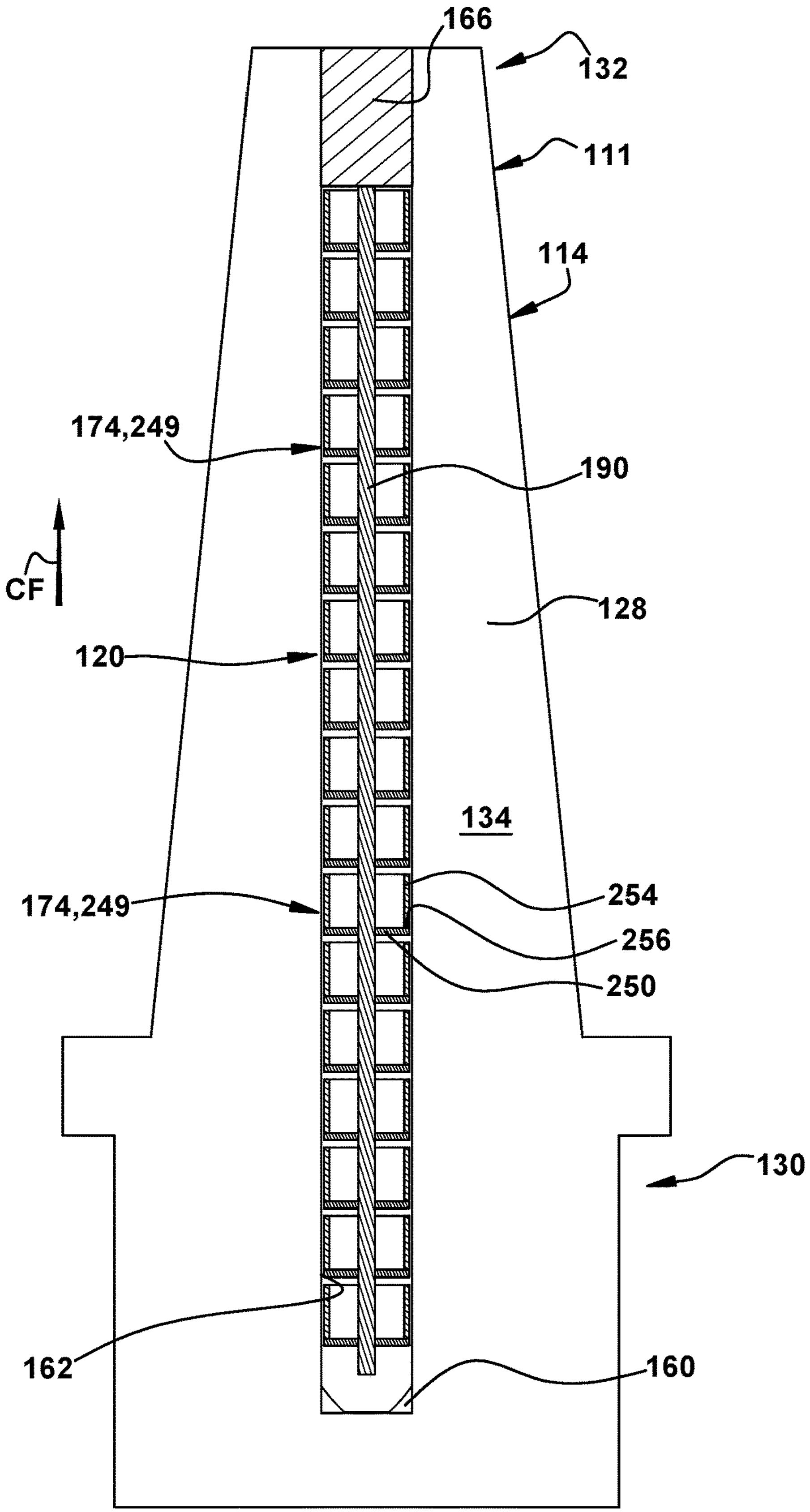
FIG. 18 shows a schematic cross-sectional view of a turbine blade having a vibration dampening system including a plurality of spring-suspended damper elements around an RTE body, according to embodiments of the disclosure.
Figure 20:
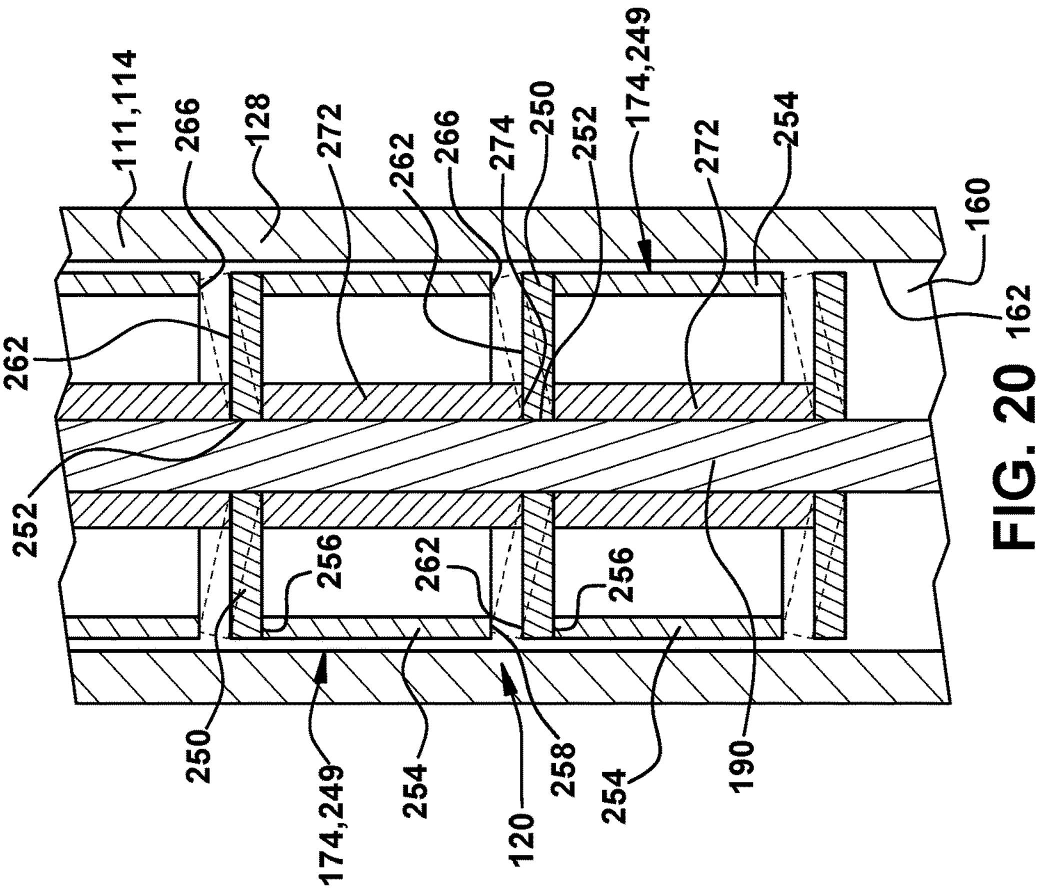
FIG. 20 shows a cross-sectional view a vibration dampening system including a plurality of spring-suspended damper elements around an RTE body, according to another embodiment of the disclosure.
Figure 19:
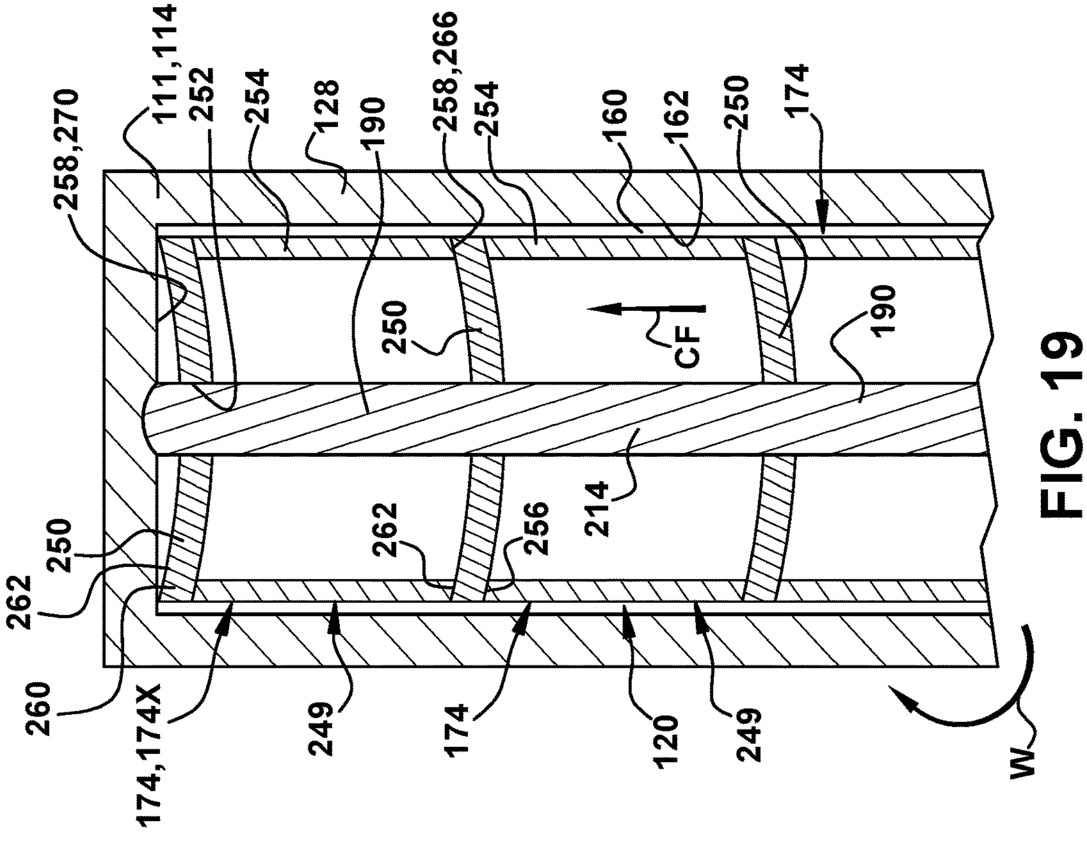
FIG. 19 shows a cross-sectional view of a vibration dampening system including a plurality of spring-suspended damper elements in an operative position around an RTE body, according to other embodiments of the disclosure.

FIGS. 17-20 show schematic cross-sectional views of turbine component 111, such as a turbine blade 114, including a vibration dampening system 120 using an RTE body 190 with stacked damper elements 174 that include spring-suspended bearing members 249. FIG. 19 shows an enlarged cross-sectional view of spring-suspended bear members 249. FIG. 20 shows an enlarged cross-sectional view of spring-suspended bear members 249 according to an alternative embodiments.

FIGS. 17 and 18 show damper elements 174 may include RTE body 190 having an axially fixed position within body opening 160. In FIGS. 17 and 18, spring-suspended bearing member 249 includes a disc spring 250 fixedly coupled to RTE body 190 at a center 252 of disc spring 250 and a bearing member 254 coupled to a first side 256 of disc spring 250 at an outer portion thereof, i.e., relative to center 252. Bearing member 254 may include any element capable of frictionally engaging a first bearing surface 258 to dampen vibration. As will be described, a location of first bearing surface 258 can vary depending on the particular damper element 174. In FIGS. 17-20, disc spring 250 includes any form of disc spring, also known alternatively as, for example: a Belleville washer, Belleville spring, cupped spring washer, coned-disc spring, conical spring washer, etc. While shown in a planar, initial configuration, disc spring 250 can also have any frustoconical arrangement, among other shapes. Disc spring 250 can have any form capable of providing a desired spring action or spring constant.

Disc spring 250 has center 252 coupled to RTE body 190, and an outer portion 260 having a first side 256 coupled to bearing member 254. Disc spring 250 also includes a second side 262 opposite first side 256. Center 252 of disc spring 250 may be fixedly coupled to RTE body 190 of in any now known or later developed fashion. For example, where center 252 includes an opening, center 252 of disc spring 252 may be welded or brazed to RTE body 190. Alternatively, disc spring 250 and RTE body 190 may be additively manufactured as integral parts, along with bearing member 254. Bearing member 254 is coupled to first side 256 of disc spring 250 and extends radially distal from first side 256 of disc spring 250, i.e., relative to a turbine axis. In certain embodiments, bearing member 254 may extend radially inward, i.e., toward base end 130 of blade 114 from first side 256 of disc spring 250. FIG. 18 shows a cross-sectional view of spring-suspended bearing member 249 in which bearing member 254 also extends radially distal from first side 256 of disc spring 250, but radially outward from first side 256 of disc spring 250, i.e., toward tip end 132 of blade 114. Disc spring 250 can have a thickness that is different than bearing member 254. The thickness of disc spring 250 may vary over its radial extent to provide any desired spring action or spring constant.

FIG. 19 shows damper elements 174 in an operative position in which disc springs 250 are in an elastically extended state under influence of a centrifugal force CF caused by rotating blade 114 rotating above a predefined rotational speed. In this position, disc springs 250 are elastically extended (radially outward toward tip end 132 (FIGS. 17-18)) at outer portions 260 thereof, causing an gap between disc springs 250 (see FIGS. 17-18) to disappear, and causing bearing member 254 to frictionally engage first bearing surface 258 to dampen vibration. As shown, for stacked damper elements 174 other than a radially outermost damper element 174X, first bearing surface 258 may be second side 262 of an adjacent damper element's disc spring 250. That is, first bearing surface 258 includes second side 262 of disc spring 250 opposite from first side 256. Here, end surface 266 of bearing member 254 frictionally engages second side 262 of disc spring 250 of an adjacent damper element 174 to dampen vibration. For radially outermost damper element 174X, second side 262 of its disc spring 250 frictionally engages a first bearing surface 258 that is part of an end surface 270 of body opening 160, i.e., a radially outer end surface 270. In view of the foregoing, it will be recognized that first bearing surface 258 may be located on one of: second side 262 of disc spring 250 and end surface 270 of body opening 160 in rotating blade 114. An "elastically extended state" indicates disc spring 250 has extended sufficiently to have bearing member 254 frictionally engaging first bearing surface 258, but may not be fully extended due to the travel distance of bearing member 254 being limited by first bearing surface 258. Disc spring 250 may also be used to control the predefined resonant frequency of RTE body 190, e.g., by providing a different outer dimension and/or attachment/pinning location between the ends of RTE body 190.

FIG. 20 shows a cross-sectional view of another embodiment in which disc spring 250 can be, but is not necessarily, fixedly coupled to RTE body 190. In FIG. 20, RTE body 190 may further includes a positioning collar 272, which may be concentrically arranged with RTE body 190. Positioning collar 272 thus may axially position respective disc springs 250 relative to RTE body 190 without disc springs 250 being fixedly coupled to RTE body 190. Positioning collar 272 can be a tubular member that slides onto RTE body 190, or can be integral with RTE body 190. In any event, an end 274 of positioning collar 272 may abut second side 262 of disc springs 250 adjacent center 252 to position disc springs 250 and to provide a surface upon which disc springs 250 can elastically extend. Positioning collar 272 may also be used to control the predefined resonant frequency of RTE body 190, e.g., by providing a different outer dimension.

Figure 21:
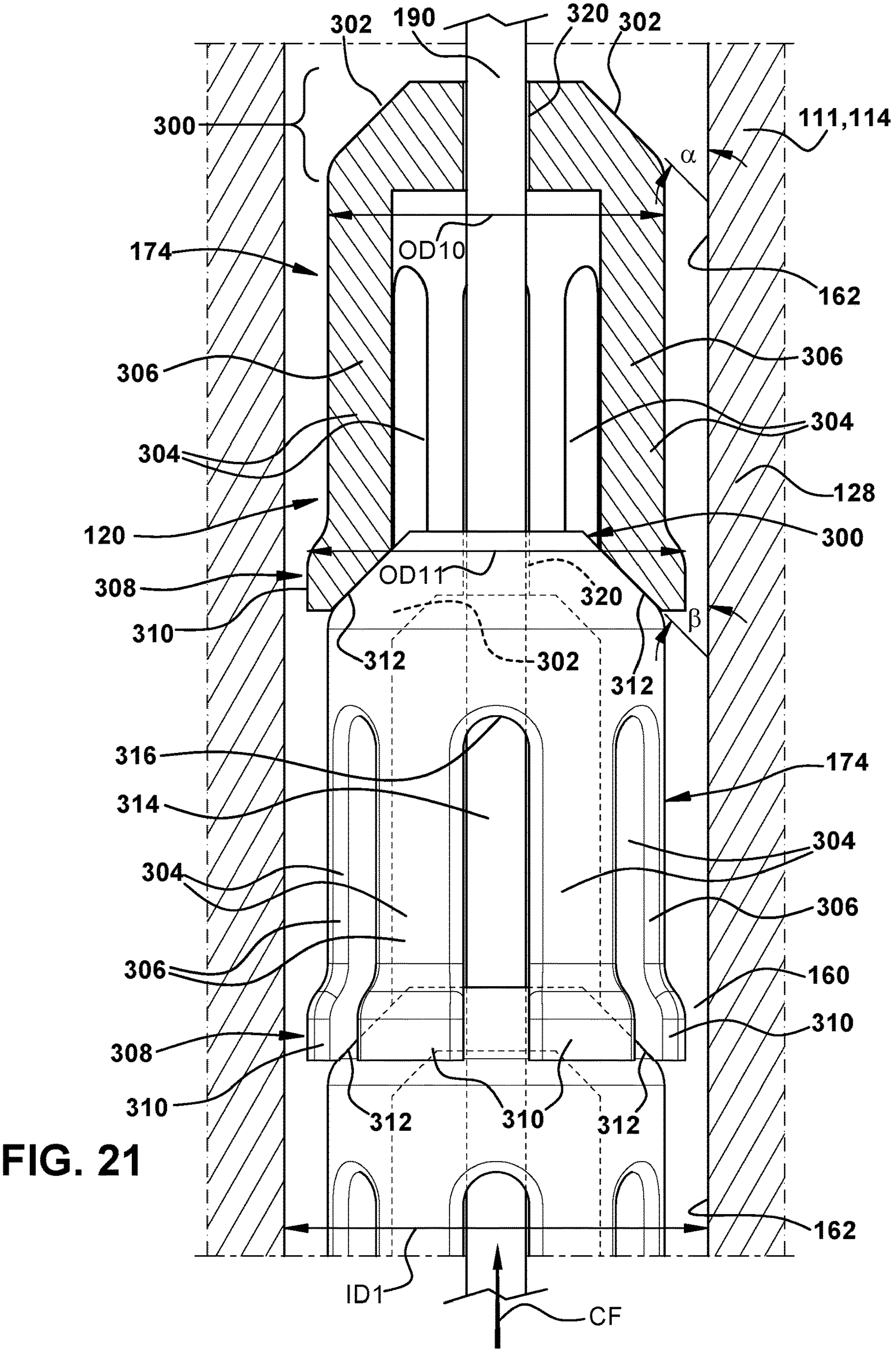
FIG. 21 shows a side, partially cross-sectional view of a vibration dampening system including a plurality of stacked damper elements with flexible legs in a first position around an RTE body, according to other embodiments of the disclosure.
Figure 22:
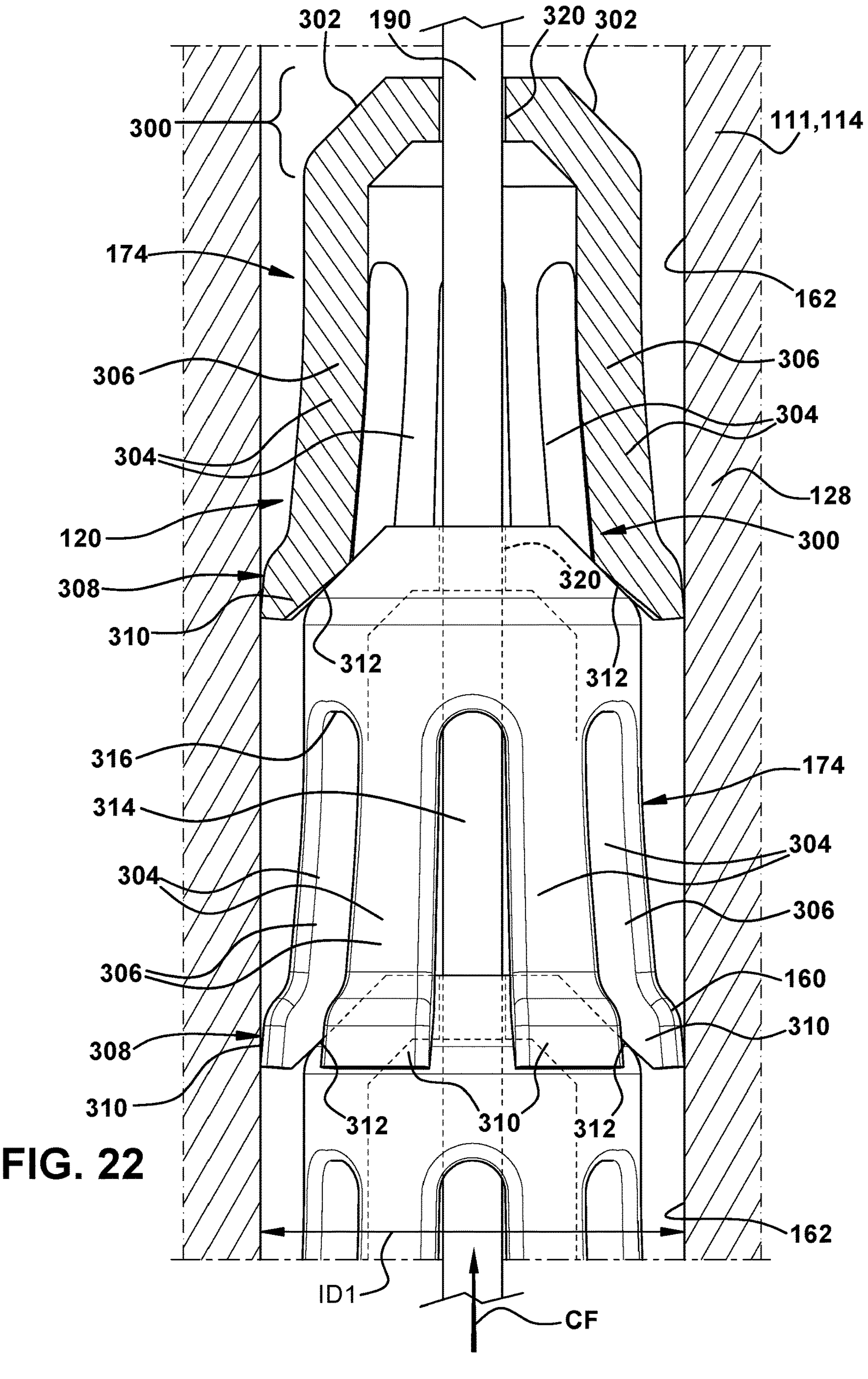
FIG. 22 shows a side, partially cross-sectional view of a vibration dampening system including a plurality of stacked damper elements with expandible legs in a second position around an RTE body, according to other embodiments of the disclosure.

FIGS. 21-22 shows a side, partially cross-sectional view of vibration dampening system 120 including a plurality of stacked damper elements 174 including flexible legs, according to other embodiments of the disclosure. FIG. 21 shows damper elements 174 in a first, relaxed position, and FIG. 22 shows damper elements 174 in a second, operative position with flexible legs frictionally engaged with body opening 160. In this embodiment, damper elements 174 includes a head member 300 having an at least partially ramped surface 302. Damper element 174 also includes a plurality of flexible and expandable legs 304 (hereafter simply "flexible legs 304") extending from head member 300. Each flexible leg 304 includes a radially extending body section 306 (relative to blade 114) having an end section 308. End sections 308 have an outer end surface 310 and an inner end surface 312. As shown in FIGS. 21-22, head member 172 engages with flexible legs 304 of another, adjacent damper element 174 to cause flexible legs 304 thereof to flex outwardly and frictionally engage with inner surface 162 of body opening 160 under influence of a centrifugal force CF caused by rotation of rotating blade 114 at higher than a predefined rotational speed to dampen vibration.

Each flexible leg 304 can have any structure capable of permitting it to flex outwardly such that outer end surfaces 310 can frictionally engage with inner surface 162 of body opening 160 in blade 114. In the illustrative embodiments shown, adjacent radially extending body sections 306 (hereafter "body sections 306") of flexible legs 304 define a slot 314 therebetween. Slots 314 may terminate at head member 300. Slots 314 may have a rounded radially outer extent 316, e.g., U-shaped; however, other shapes are also possible, e.g., V-shaped, cathedral-shaped, etc. Any number of flexible legs 304 can be provided on each damper element 174. In certain embodiments, between three (3) and six (6) flexible legs 304 are used on each damper element 174, but other numbers are also possible. In other embodiments, body sections 306 can have alternative structures to aid and/or control flexing thereof such as but not limited to: wider or thinner sections, curvature, voids, etc.

As noted previously, head member 300 has at least partially ramped surface 302. At least partially ramped surface 302 (hereafter "ramped surface 302" for brevity) may extend all the way around it, e.g., as a solid circular surface, or partially around head member 300, i.e., with breaks or open areas between similarly ramped surfaces. Ramped surface(s) 302 may have an angle $\alpha$ in a range between 25° and 55° degrees relative to inner surface 162 of body opening 160. As noted, body opening 160 may extend generally radially in body 128 of blade 114. Inner end surfaces 312 of plurality of flexible legs 304 are configured to receive ramped surface 302 of head member 300 of an adjacent damper element 174, i.e., engage and move under influence of ramped surface 302. Inner end surfaces 312 of flexible legs 304 may have an angle $\beta$ in a range between 25° and 55° degrees relative to inner surface 162 of body opening 160. Angle $\alpha$ and angle $\beta$ may be the same, but this is not necessary in all cases, so long as head member 300 can force legs 304 of an adjacent damper element 174 outwardly toward inner surface 162 of body opening 160. That is, head member 300 of an adjacent damper element 174 can force outer end surfaces 310 of flexible legs 304 into frictional engagement with inner surface 162 of body opening 160 to dampen vibration when a particular centrifugal force CF is applied based on a predetermined rotational speed of blade 114.

In certain embodiments, head member 300 and, collectively, body sections 306 of flexible legs 304 each have a first outer dimension OD9. Outer end surfaces 310 of flexible legs 304 collectively define a second outer dimension OD10 that is larger than first outer dimension OD9. Hence, head member 300 and body sections 306 have a smaller outer dimension OD9 than outer end surfaces 310 of flexible legs 304, i.e., OD10. Although shown and described as the same outer dimension OD9, body sections 306 and head member 300 may have different outer dimensions so long as they are both smaller than the outer dimension OD10 of outer end surfaces 310. As shown in FIGS. 21 and 22, second outer dimension OD10 of outer end surfaces 310 is matches inner dimension ID1 of body opening 160 whereby, in a relaxed state, flexible legs 304 pass freely within body opening 160. Further, in certain embodiments, outer end surfaces 310 of each flexible leg 304 may be parallel to inner surface 162 of body opening 160 in a relaxed state of the plurality of flexible legs 304. In other embodiments, outer end surfaces 310 of each flexible leg 304 may be non-parallel to inner surface 162 of body opening 160 in a relaxed state of the plurality of flexible legs 304, but not more than +/−5°. In any event, damper elements 174 can be easily inserted into body opening 160 singularly or in a pre-stacked fashion without outer end surfaces 310 of end sections 308 thereof interfering with the insertion.

As shown in FIGS. 21-22, damper elements 174 include an opening 320 defined through a center of head member 300, and RTE body 190 extends through opening 320 in head member 300. Opening 320 and RTE body 190 can have any mating cross-sectional shape such as circular, oblong or oval, polygonal, etc. A single RTE body 190 can extend through each damper element 174 in a stack of damper elements 174 in vibration dampening system 120. RTE body 190 is configured to resonate at the predefined resonant frequency, e.g., a same frequency as rotating blade 114 at body opening 160, whereby RTE body 190 generates a force against damper element(s) 174. As noted herein, RTE body 190 can be configured to resonate at the predefined resonant frequency, e.g., same resonant frequency as rotating blade 114, by controlling, among other factors, its mass, flex, hardness, dimension and length. RTE body 190 slides freely in opening 320 but has close clearance therewith such that movement of RTE body 190 caused by vibration of blade 114 will physically impact an inside of opening 320, causing the respective damper element 174 to move. In this manner, RTE body 190 can reduce the likelihood that damper element(s) 174 becoming stuck against inner surface 162 of body opening 160 or to each other. In other embodiments, not shown, vibration dampening system 120 as shown in FIGS. 21-22 may further include a radially outer retainer element fixed to RTE body 190 to retain plurality of stacked damper elements 174 on RTE body 190.

Figure 23:
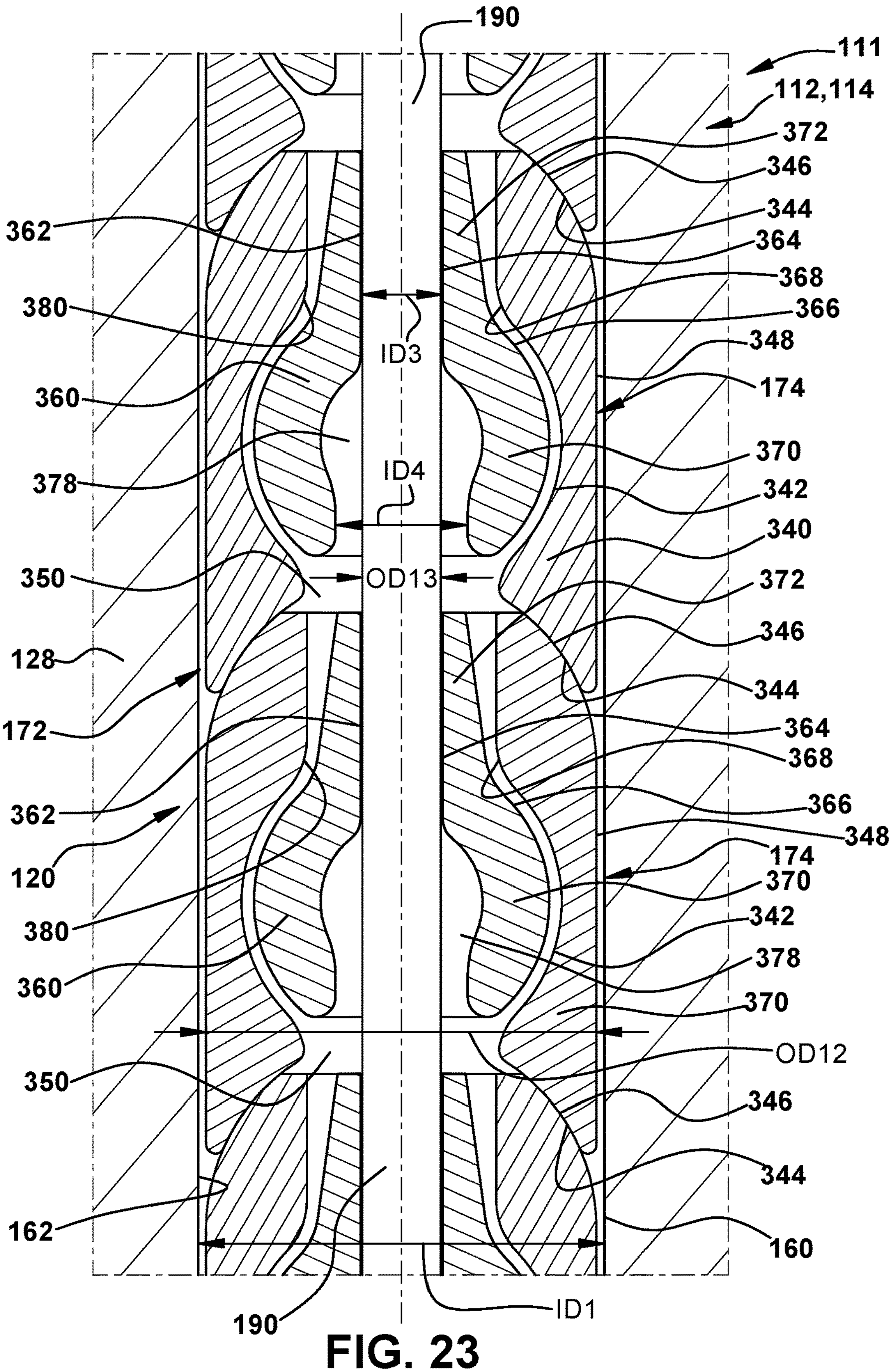
FIG. 23 shows a cross-sectional enlarged view of a vibration dampening system including a pair of damper elements, each including an outer body and an inner body, around an RTE body, according to embodiments of the disclosure.
Figure 24:
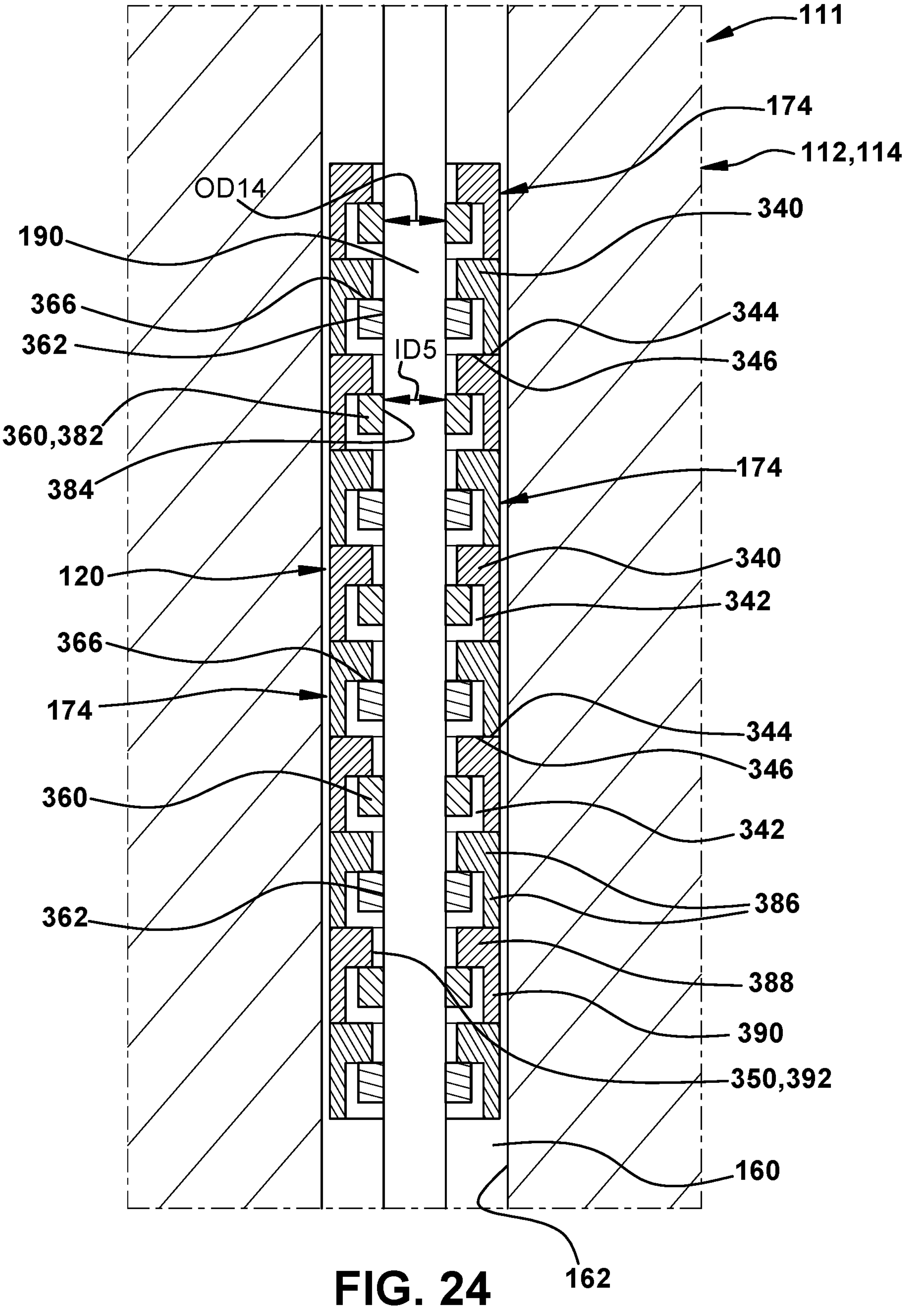
FIG. 24 shows a cross-sectional view of a vibration dampening system including a plurality of damper elements, each including an outer body and an inner body, around an RTE body, according to other embodiments of the disclosure.

FIG. 23 shows a cross-sectional enlarged view of vibration dampening system 120 including damper elements 174, each including an outer body and an inner body, around RTE body 190, according to embodiments of the disclosure. FIG. 24 shows a cross-sectional view of vibration dampening system 120 including damper elements 174, each including an outer body and an inner body, around RTE body 190, according to other embodiments of the disclosure. Each damper element 174 may include an outer body 340 having an inner opening 342. Outer body 340 may also include a first end surface 344 and an opposing second end surface 346.

Outer body 340 may have an outer surface 348 having a shape and dimension to match body opening 160, e.g., fit within body opening 160. A noted, body opening 160 has inner surface 162 having inner dimension ID1. Each outer body 340 has an outer dimension OD11 sized to frictionally engage inner dimension ID1 of body opening 160 to dampen vibration during motion of turbine component 111, e.g., nozzle 112 or blade 114. That is, outer dimension OD11 of outer body 340 of each damper element 174 rubs against inner surface 162 of body opening 160 to dampen vibration, e.g., during movement of airfoil 134 (FIGS. 3-4) of nozzle 112 or blade 114. During assembly, inner dimension ID1 and outer dimension OD11 are sized to allow damper elements 174 to be positioned in body opening 160, i.e., they match as defined herein. In one non-limiting example, a difference between outer dimension OD11 of damper elements 174 and inner dimension ID1 of inner surface 162 of body opening 160 may be in a range of approximately 0.04-0.06 millimeters (mm), which allows insertion of damper elements 174 but frictional engagement during use and relative movement of airfoil 134 (FIGS. 3-4) of nozzle 112 or blade 114.

First end surface 344 and second end surface 346 of outer body 340 are complementary of one another, i.e., they fit together, so they can frictionally engage one another. In the FIG. 23 embodiment, first end surface 344 of outer body 340 is at least partially concave, and second end surface 346 of outer body 340 is at least partially convex. In this manner, first end surface 344 and second end surface 346 of adjacent damper elements 174 can frictionally engage and rotationally move relative to one another as nozzle 112 or blade 114 moves.

In another embodiment, shown in the schematic cross-sectional view of FIG. 24, first end surface 344 of outer body 340 is planar, and second end surface 346 of outer body 340 is also planar. Here also, first end surface 344 and second end surface 346 of adjacent damper elements 174 can frictionally engage and slidingly move relative to one another as turbine component 111, e.g., nozzle 112 or blade 114, moves. Other complementary shapes for end surfaces 344, 346 are also possible. Outer body 340 also includes a central opening 350 (part of inner opening 342) extending through first end surface 344 and second end surface 346. As will be described, central opening 350 is configured to allow RTE body 190 to extend therethrough and to allow pivoting movement of an inner body 360 within outer body 340.

Each damper element 174 may also include an inner body 360 nested and movable within inner opening 342 of outer body 340. Inner body 360 has a central opening 362 including a first portion 364 configured to engage RTE body 190 therein. Inner body 360 also includes an outer surface 366 configured to frictionally engage a portion 368 of inner opening 342 of outer body 340. Inner body 360 and inner opening 342 of outer body 340 may take a variety of forms. In certain embodiments, shown in FIG. 23, outer surface 366 of inner body 360 may have a pear shape. More particularly, outer surface 366 of inner body 360 may include a bulbous base portion 370 and a narrower neck portion 372. Bulbous base portion 370 and narrower neck portion 372 are integral to one another, i.e., it is a unitary structure. In the example shown in FIG. 23, narrower neck portion 372 includes first portion 364 of central opening 362 of inner body 360. First portion 364 has an inner dimension ID2 configured to engage with an outer dimension OD12 of RTE body 190. Inner dimension ID2 allows sliding engagement with outer dimension OD12 of RTE body 190. However, first portion 364 of central opening 362 has sufficient (radial) length to mandate inner body 360 moves with RTE body 190, e.g., it tilts, pivot or otherwise moves under the influence of RTE body 190. It can also control the predefined resonant frequency of RTE body 190.

Bulbous base portion 370 includes a second portion 378 of central opening 362 of inner body 360 that has a larger inner dimension ID3 than inner dimension ID2 of first portion 364 of central opening 362 of inner body 360. Hence, second portion 378 of central opening 362 of inner body 360 is distanced from RTE body 190. Central opening 350 of outer body 340 is also distanced from inner body 360 of damper element 174 and RTE body 190 at both end surfaces 344, 346. In this manner, second portion 378 of central opening 362 of inner body 360 allows pivoting movement of inner body 360 within outer body 340 under the influence of bending and/or moving of RTE body 190 as turbine component 111, i.e., nozzle 112 or blade 114, vibrate.

Inner opening 342 of outer body 340 has a shape configured to receive the pear shape of outer surface 366 of inner body 360 and allow frictional engagement between inner body 360 and outer body 340 under the influence of RTE body 190 on inner body 360. When RTE body 190 moves, e.g., bends with airfoil 134 during operation thereof, it imparts motion to inner body 360 via first portion 364 of central opening 362 of inner body 360, which can cause inner body 360 to rock or tilt relative to outer body 340. As this occurs, inner body 360 and outer body 340 frictionally engage one another to dampen vibration. The frictional engagement can occur anywhere along outer surface 366 of inner body 360 and inner opening 342 of outer body 340. For example, frictional engagement may occur near an upper portion (as illustrated on the page of FIG. 23) of bulbous base portion 370 and outer surface 366 of inner body 360 and a corner 380 of inner opening 342 of outer body 340 where it enlarges to match the pear shape of inner body 360. Frictional engagement can also occur anywhere along outer surface 366 of bulbous base portion 370 and/or narrower neck portion 372.

With further regard to FIG. 24, in certain embodiments, inner body 360 includes a planar washer member 382. Planar washer member 382 may include any plate having a central opening 384 therein. Central opening 384 of planar washer member 382 has an inner dimension ID4 configured to engage with outer dimension OD13 of RTE body 190, i.e., sliding engagement but forcing lateral pivoting with RTE body 190. Inner dimension ID4 allows sliding engagement with outer dimension OD13 of RTE body 190. However, planar washer member 382 has sufficient (radial) length to mandate that it moves with RTE body 190, e.g., it tilts, pivot or otherwise moves under the influence of RTE body 190. In this manner, inner body 360 (washer member 382) moves with RTE body 190 as turbine component 111, e.g., nozzle 112 or blade 114, move.

In FIG. 24, outer body 340 includes a cup member 386 providing inner opening 342, which is configured to receive planar washer member 382. In one example, cup member 386 includes a base 388 and a tubular side 390 that collectively surround and encapsulate planar washer member 382 therein with an adjacent damper element 174. Outer body 340 also includes first end surface 344 and second end surface 346 (surfaces of cup member 386), which are planar as previously noted. Inner body 360 and, more particularly, cup member 386 also includes central opening 392 (part of inner opening 342) through which RTE body 190 may freely pass. Inner body 360, including planar washer member 382, may frictionally engage with any part of inner opening 342 of outer body 340 to dampen vibration. Planar end surfaces 344, 346 of adjacent damper elements 174 also frictionally engage with one another to dampen vibrations. Outer body 340 (i.e., outer surface of cup member 386) is sized to slide into body opening 160, but also may frictionally engage with inner surface 162 of body opening 160 to dampen vibration during operation of nozzle 112 or blade 114, i.e., their respective dimensions match. RTE body 190 may also deflect during operation of nozzle 112 or blade 114 to dampen vibration. Any number of stacked damper elements 174 as in FIG. 24 may be employed in vibration dampening system 120.

Referring again to FIG. 23, vibration dampening system 120 may include RTE body 190 extending within and fixed relative to body opening 160. RTE body 190 extends through inner opening 342 of outer body 340 including central opening in end surfaces 344, 346. RTE body 190 also extends through second portion 378 of central opening 362 of inner body 360, and is slidingly engaged by first portion 364 of central opening 362 of inner body 360. More particularly, RTE body 190 extends in body opening 160 of turbine component 111, e.g., nozzle 112 or blade 114, and is engaged within first portion 364 of central opening 362 of each inner body 360 of the plurality of stacked damper elements 174. As described previously, first portion 364 of central opening 362 of inner body 360 and RTE body 190 are sized and shaped such that inner body 360 slides freely on RTE body 190, but inner body 360 can be moved as RTE body 190 dictates. In this manner, each damper element 174 may experience different movement by RTE body 190 and provide different vibration dampening through frictional engagement of outer body 340 and inner body 360. Vibration dampening system 120 in FIG. 24 operates in a similar fashion. The various shapes and sizes of outer body 340 and inner body 360 may also be used to control the predefined resonant frequency of RTE body 190.

Figure 25:
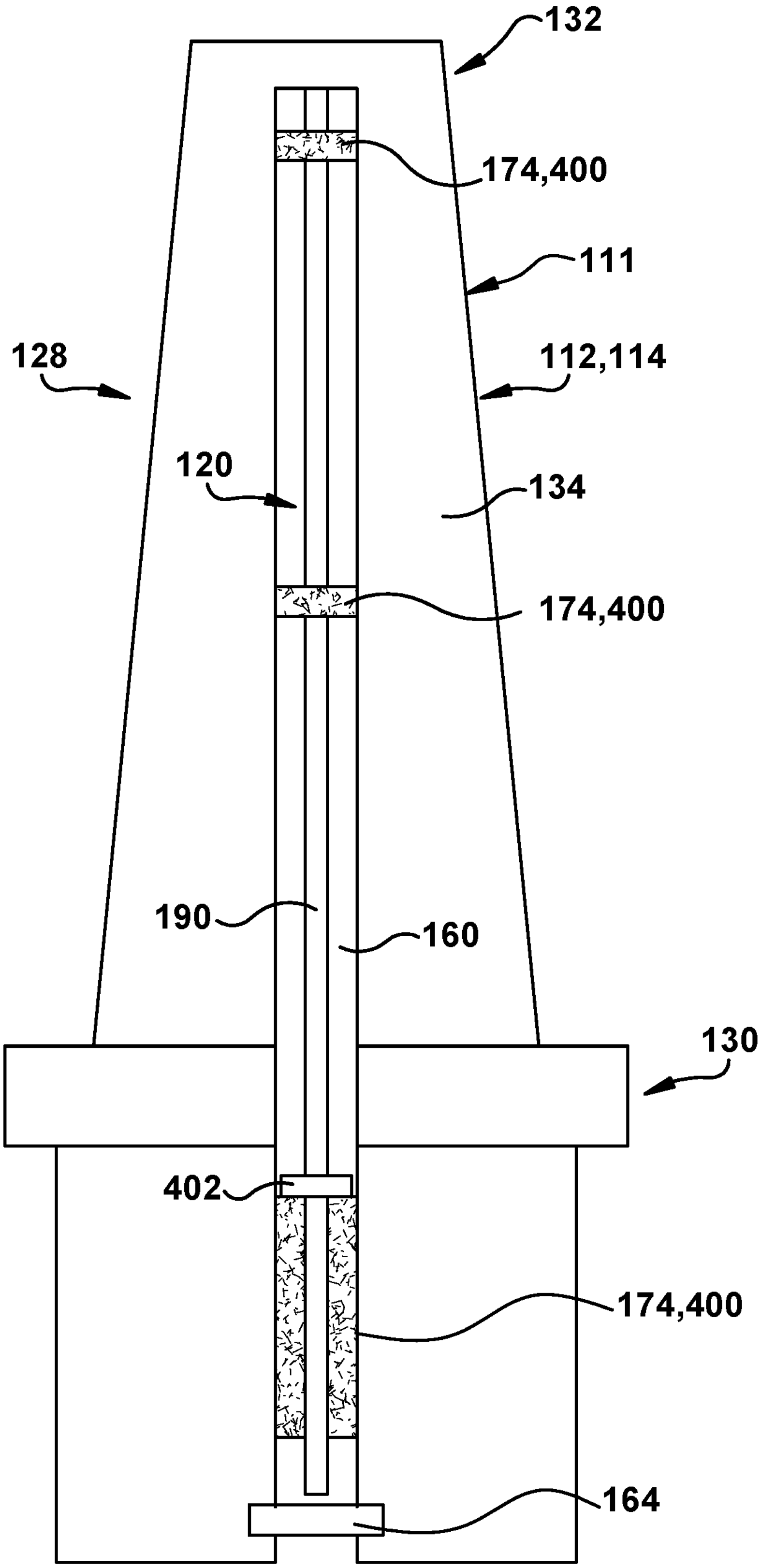
FIG. 25 shows a schematic cross-sectional view of a turbine component having a vibration dampening system including a wire mesh member around an RTE body, according to embodiments of the disclosure.

FIG. 25 shows a schematic cross-sectional view of vibration dampening system 120 including an RTE body 190 used with damper elements 174 in the form of wire mesh members 400. FIG. 25 shows RTE body 190 attached at tip end 130 of turbine component 111 and with a number of wire mesh members 400. Retention members 402 may be located along RTE body 190 to hold wire mesh members 400 and control the predefined resonant frequency of RTE body 190.

Figure 26:
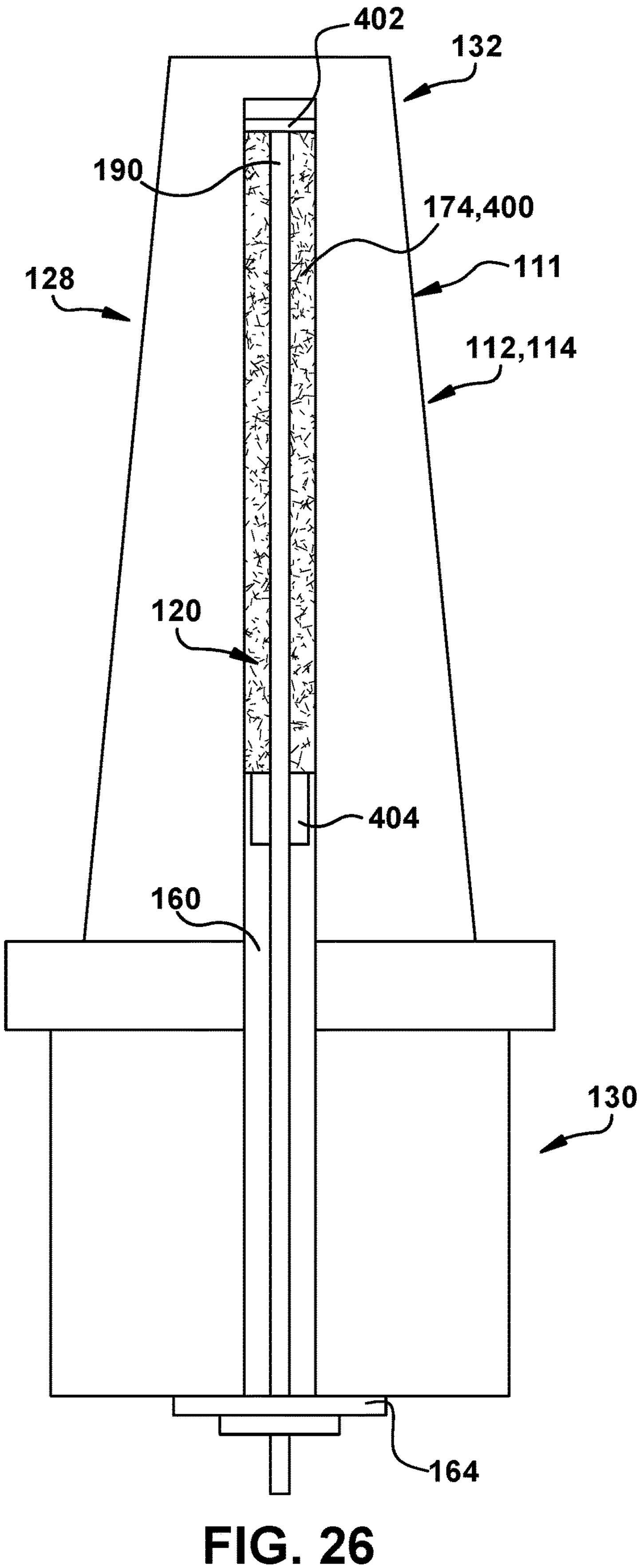
FIG. 26 shows a schematic cross-sectional view of a turbine component having a vibration dampening system including a wire mesh member around an RTE body, according to other embodiments of the disclosure.

FIG. 26 shows a schematic cross-sectional view of vibration dampening system 120 including an RTE body 190 used with damper elements 174 in the form of wire mesh members 400. FIG. 26 shows RTE body 190 attached at base end 132 of turbine component 111 and with a single mesh member 400. Retention member 402 may be located along RTE body 190 to hold wire mesh member 400 and control the predefined resonant frequency of RTE body 190. A vibration dampening system 120 may also optionally include a compression member 404 movable along RTE body 190 to compress wire mesh member(s) 400 against retention member 402 during operation of turbine component 111, i.e., beyond the compression provided by centrifugal force of the rotating blades 114.

Figure 27:
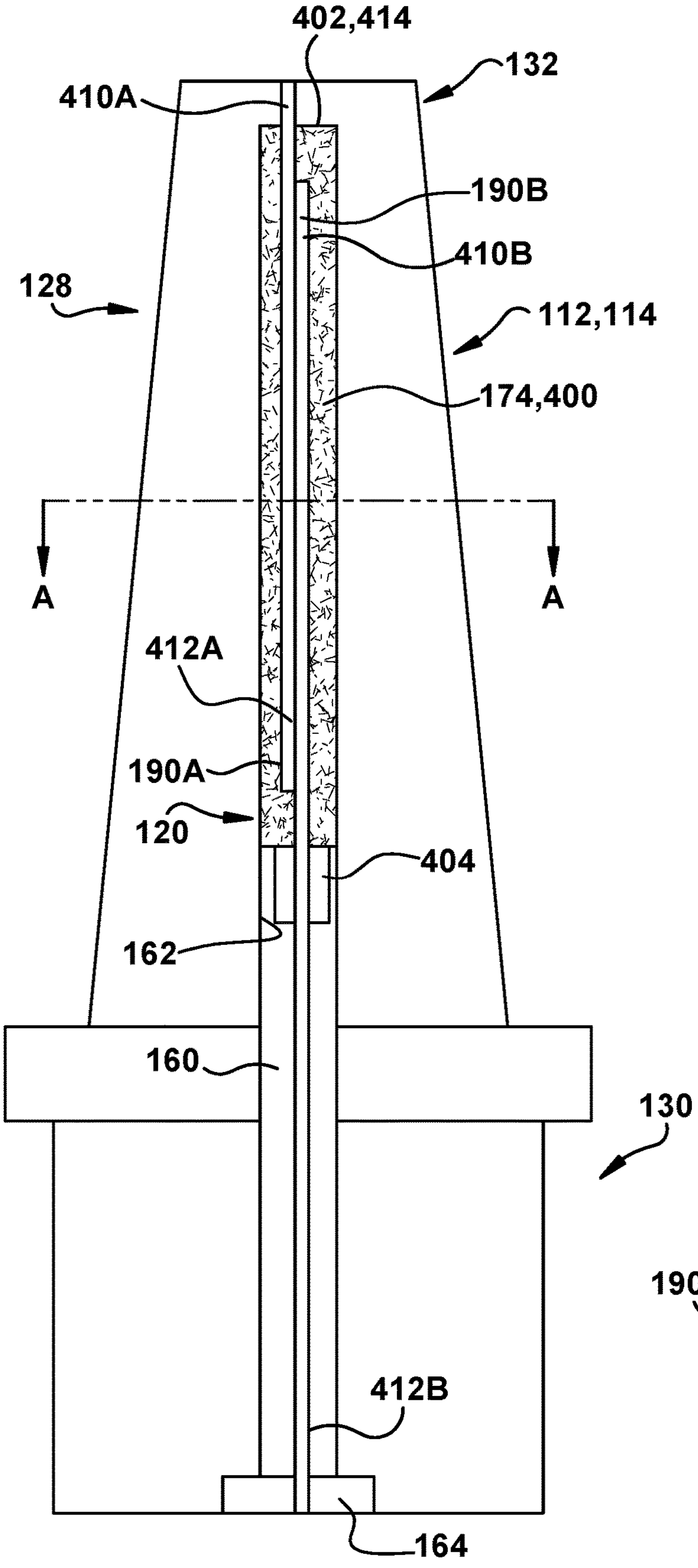
FIG. 27 shows a schematic cross-sectional view of a turbine component having a vibration dampening system including a wire mesh member with a plurality of RTE bodies therethrough, according to additional embodiments of the disclosure.

Referring to FIG. 27, in another embodiment, more than one RTE body 190 can be used. Here, RTE bodies 190 include at least one first RTE body 190A having second end 410A thereof fixed relative to tip end 132 of body 128, and a first, free end 412A thereof extending towards base end 130. RTE bodies 190 also include at least one second RTE body 190B having a second end 412B thereof fixed relative to base end 130 of body 128, and a first, free end 410B thereof extending towards tip end 132. Any number of each RTE bodies 190A, 190B may be employed.

Wire mesh member(s) 400 surround both types of RTE bodies 190A, 190B to force each RTE body 190A, 190B into contact with at least one other RTE body 190A, 190B during operation of turbine component 111. In this manner, each RTE body 190A, 190B is in contact with at least one other RTE body 190A fixed to tip end 132 and/or at least one other RTE body 190B fixed to base end 130.

Figure 28:
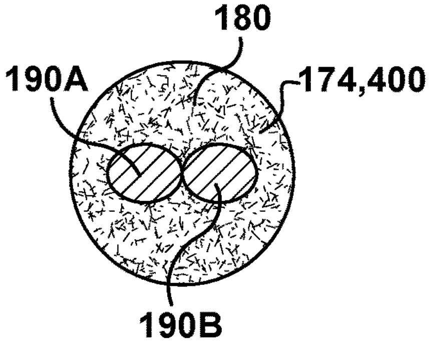
FIG. 28 shows a cross-sectional view, taken along view line A-A in FIG. 27, of a vibration dampening system using a plurality of RTE bodies, according to embodiments of the disclosure.
Figure 29:
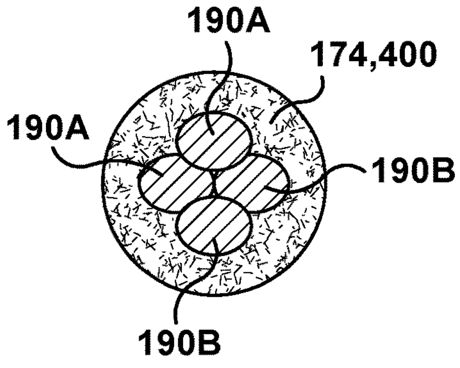
FIG. 29 shows a cross-sectional view, taken along view line A-A in FIG. 27, of a vibration dampening system using a plurality of RTE bodies, according to other embodiments of the disclosure.

FIGS. 28 and 29 show cross-sectional views along view line A-A in FIG. 27 of various embodiments. FIG. 28 shows a cross-sectional view of an embodiment including one RTE body 190A, and one RTE body 190B. FIG. 29 shows a cross-sectional view including a plurality of (e.g., two) RTE bodies 190A, and a plurality of (e.g., two) RTE bodies 190B. Any number of each type of RTE body 190A, 190B may be used so long as they can be surrounded by wire mesh member(s) 400 to allow limited movement within body opening 160, e.g., circumferentially (into and out of page) and radially (up and down page).

A retention member 402 (FIGS. 25-26) may be provided to retain wire mesh member(s) 400 relative to a length of RTE bodies 190, 190A, 190B. In one example, retention member 402 may be positioned on one or more of RTE bodies 190A and/or 190B, as in FIG. 25, to prevent wire mesh member(s) 400 from moving relative to a length of RTE bodies 190, e.g., because of centrifugal or vibrational forces of blades 114 or vibrational forces of nozzle 112. Alternatively, as shown in FIG. 27, retention member 402 may be provided by a closed end 414 of body opening 160 at tip end 132 in body 128. (Note, this retention member arrangement can also be used as an alternative for the FIGS. 25-26 embodiments.) In FIG. 27, fixed end 410A of RTE body(ies) 190A may be fixed by being threaded or otherwise fastened into closed end 414 of body opening 160. Although not shown, fixed end 412B of RTE body(ies) 190B may be similarly fixed in base end 130.

Figure 30:
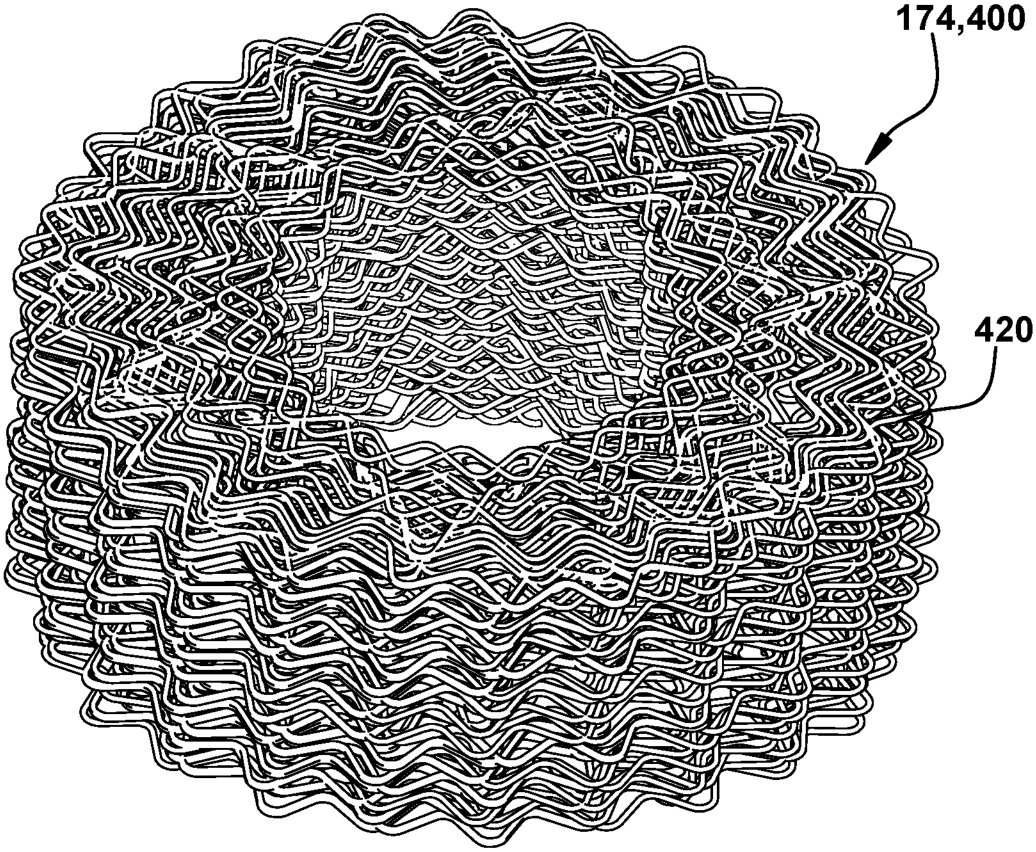
FIG. 30 shows a perspective view of a wire mesh member, according to embodiments of the disclosure.

FIG. 30 shows a perspective view of an illustrative wire mesh member 400. Wire mesh member 400 includes any now known or later developed wire mesh dampening material suitable for restricting movement of RTE body(ies) 190. Wire mesh member(s) 400 may also be coated in various coating materials to alter frictional properties thereof. Wire mesh member 400 may be referred to as 'metal rubber.' As shown in FIG. 30, wire mesh member(s) 400 may include a knitted wire-mesh material 418.

Figure 31:
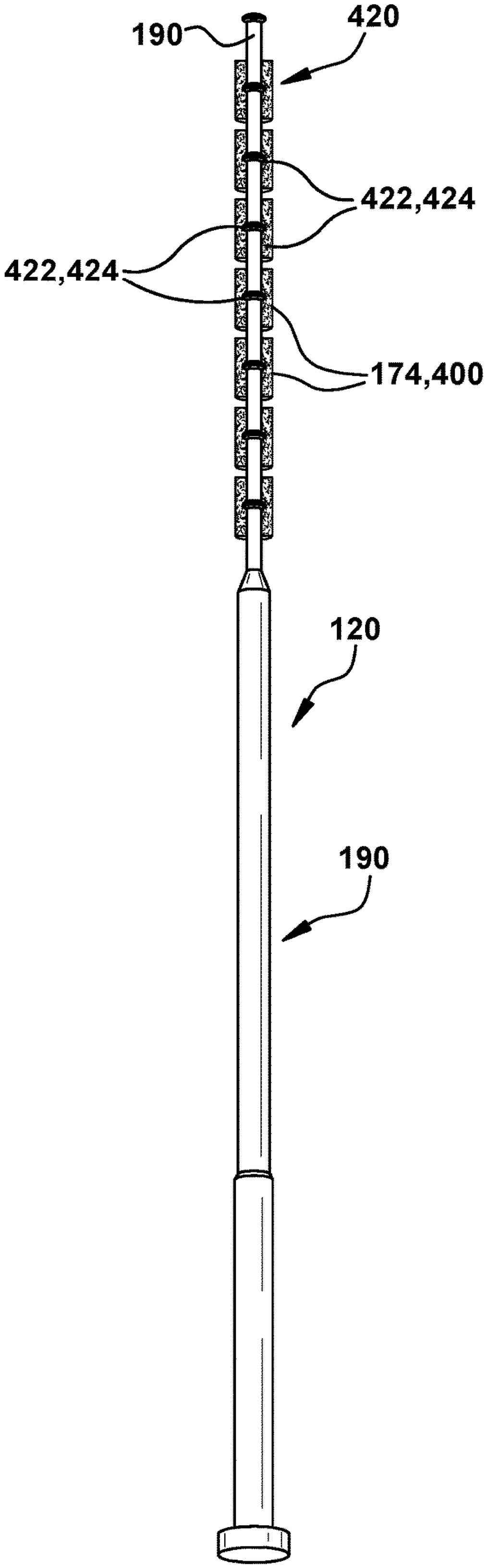
FIG. 31 shows a perspective view of an RTE body for a vibration dampening system including a wire mesh member retention system, according to embodiments of the disclosure.

FIG. 31 shows a perspective view of vibration dampening system 120 including an RTE body 190 including a retention system 420 including a number of retention members 422. In this embodiment, each retention member 422 includes a protrusion 424 on RTE body 190. RTE body 190 also includes portions on outer surface thereof where protrusions 424 are not present. Protrusion(s) 424 may extend any extent around and/or along RTE body 190 to create the desired outer dimension on wire mesh member 400 and/or desired predefined resonant frequency of RTE body 190. In the exemplary embodiment, protrusion(s) 424 may extend symmetrically around the full circumference of RTE body 190, although such symmetry is not required. Any number of protrusion(s) 424 may be provided on RTE body 190, e.g., one for each wire mesh member 400.

Figure 32:
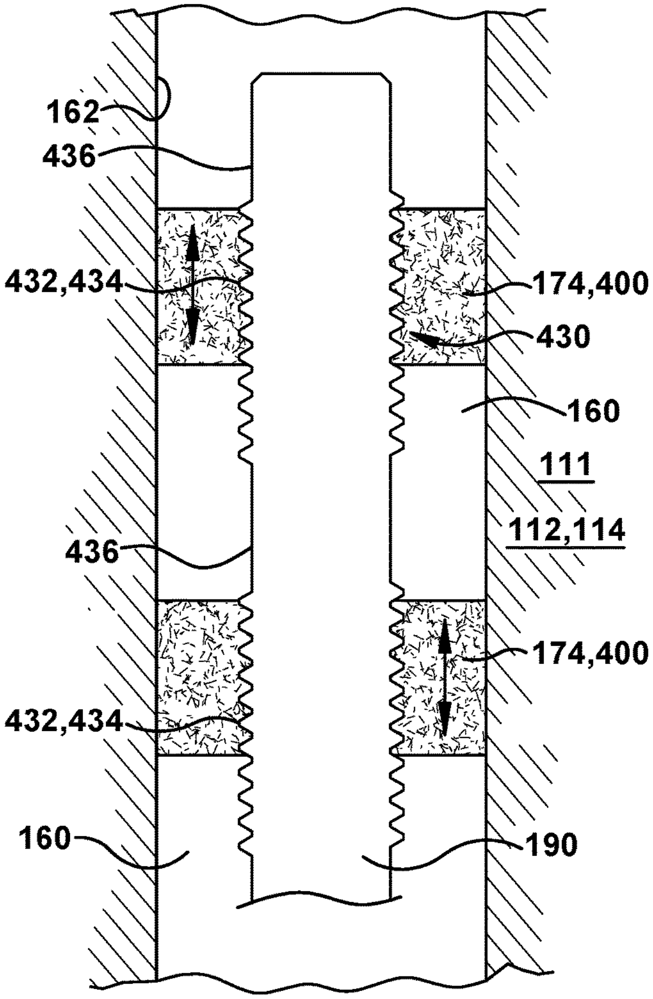
FIG. 32 shows a schematic cross-sectional view of an RTE body for a vibration dampening system including a wire mesh member retention system, according to other embodiments of the disclosure.

FIG. 32 shows an assembled side view of RTE body 190 including a retention system 430 and retention member 432, according to another embodiment of the disclosure. In this embodiment, each retention member 432 includes a threaded section 434 on a first portion of an outer surface of RTE body 190. RTE member 190 may also optionally include a non-threaded section 436 on a second portion on outer surface of RTE body 190. Where thread-free, portion 436 is provided, an inner dimension of wire mesh member 400 slides freely relative to RTE body 190. Any number of threaded sections 434 can be provided to thread into a respective number of wire mesh members 400. Threaded section(s) 434 may have any threading format necessary to allow threaded insertion into, and outward compression of, wire mesh member(s) 400 during assembly. Threaded section(s) 434 may extend any extent around and/or along RTE body 190 to create the desired outer dimension and/or predefined resonant frequency. Threaded section 434 may also alternatively extend an entire length of RTE body 190.

Referring again to FIGS. 3 and 4, in certain embodiments, a single body opening 160 is used in a turbine component 111. Alternatively, in other embodiments, turbine component 111 includes first vibration dampening system 120A with a first body opening 160A and a second vibration dampening system 120B with a second body opening 160B. Vibration dampening systems 120A in first body opening 160A includes RTE body 190A. In this alternative embodiment, more than one vibration dampening system 120 may be used with other system(s) 120B each including one or more damper elements 174 in another respective (second) body opening 160B. Damper element(s) 174 in second body opening 160B can take any of the previously described forms. Vibration dampening system 120B also includes another (second) RTE body 190B extending through an opening in damper element(s) 174 in the other body opening 160B. Second RTE body 190B may be configured to resonate at a predefined resonant frequency, e.g., at a same frequency as turbine component 111 at second body opening 160B, that is different than the predefined resonant frequency of first RTE body 190, e.g., Second RTE body 190B generates a force against damper element(s) 174 in second body opening 160B in a similar manner as that described relative to the RTE bodies described herein. Each of damper element(s) 174 in second body opening 160B has a surface in contact with at least one of second body opening 160B and the other (second) RTE body 190B.

Embodiments of the disclosure may include any turbine component 111 such as a turbine nozzle 112 or turbine blade 114. It will be recognized that those embodiments requiring centrifugal force (CF) to activate damper element(s) 174 may be employed in a turbine component 111 that rotates and experiences the centrifugal force CF, such as but not limited to a turbine blade 114.

A method according to embodiments of the disclosure may include selecting a frequency of concern Fc for turbine component 111 in operation at body opening 160 defined therein. The frequency of concern Fc may be any frequency, typically a resonant frequency, of turbine component 111 at body opening 160 that a user may want to dampen. Once a frequency of concern Fc is selected an RTE body 190 to be positioned at/in body opening 160 is configured to have a predefined resonant frequency, e.g., same as or close to the frequency of concern Fc of turbine component 11 at body opening 160. RTE body 190 configuring can include selecting (choosing and/or modifying) at least one of the following characteristics of RTE body 190 to generate the resonant frequency of RTE body 190 during operation of turbine component 111: a length, at least one outer dimension, an outer dimension taper along a length thereof, a wall thickness at at least one location, a material, at least one attachment location to the turbine component, at least one attachment type to the turbine component, and a number of the elongated bodies. In this manner, RTE body 190 can dampen vibrations at a preselected frequency of concern Fc, providing customized vibration dampening at one or more particular body opening 160 locations.

The method may further include positioning RTE body 190 through an opening in damper element(s) 174. This step can be performed outside of turbine component 111 and/or damper element(s) 174 can be positioned in body opening 160 and then RTE body 190 inserted through damper element(s) 174. In any event, RTE body 190 with damper element(s) 174 is positioned in body opening 160. As noted, damper element(s) 174 in body opening 160 has a surface in contact with at least one of body opening 160 and RTE body 190 allowing vibration dampening. The damper element(s) 174 can be selected from any form described herein, among others. In certain embodiments, shown in FIGS. 5-7, damper element(s) 174 may include a first plurality of stacked washers 176 having first outer dimension OD2 and second plurality of stacked washers 178 having second outer dimension OD3, where OD2/OD3. In certain embodiments, first outer dimension OD2 matches an inner dimension ID1 of body opening 160 (i.e., "matches" means close to same dimension or slightly smaller to allow insertion of washers 176 in body opening 160), and second outer dimension OD3 is smaller than inner dimension ID1 of body opening 160. First plurality of stacked washers 176 has a first inner dimension ID2 and the second plurality of stacked washers 178 has a second inner dimension ID3. First inner dimension ID2 is larger than outer dimension OD1 of RTE body 190 and the second inner dimension ID3 matches outer dimension OD1 of RTE body 190 (i.e., "matches" means close to same dimension or slightly larger to allow insertion of RTE body 190 into washers 178).

Embodiments of the disclosure provide various technical and commercial advantages, examples of which are discussed herein. Vibration dampening system 120 reduces turbine component vibration with a simple arrangement and does not add much extra mass to the turbine component 111, e.g., nozzle 112 or blade 114. Vibration dampening system 120 does not increase centrifugal force to nozzle 112 base end 130 or blade 114 tip end 132 or require a change in turbine component 111 configuration. Vibration dampening system 120 allows addressing a wide variety of different vibration characteristics of turbine component and/or vibration dampening system 120 (RTE body 190 and/or dampening element(s) 174) beyond just different frequency, such as different mode shapes and/or different amplitudes. Vibration dampening system 120 also allows customization of RTE body 190 attachment in a wide variety of configurations such as but not limited to: "fixed-free" with one end fixed, moment allowed, no translation and no rotation; "fixed-pinned" with one end fixed, with rotation allowed, no moment and no translation; "fixed-fixed" with both ends fixed; and various configurations with attachment (pinning) in the middle of RTE body 190.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A vibration dampening system for dampening vibrations in a turbine component configured to be installed in a first body opening of the turbine component, the vibration dampening system comprising:

one or more damper elements in the first body opening;

a first resonant-tuned elongated body extending through an opening in the one or more damper elements in the first body opening, wherein the first resonant-tuned elongated body is configured to resonate at a first predefined resonant frequency, whereby the first resonant-tuned elongated body generates a force against the one or more damper elements in the first body opening; and wherein each of the one or more damper elements in the first body opening has a surface in contact with at least one of the first body opening and the first resonant-tuned elongated body, wherein the one or more damper elements in the first body opening includes a first plurality of stacked washers having a first outer dimension and a second plurality of stacked washers having a second outer dimension, wherein the first outer dimension and the second outer dimension are different, wherein the first outer dimension matches an inner dimension of the first body opening, and the second outer dimension is smaller than the inner dimension of the first body opening, and wherein the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

2. The vibration dampening system of claim 1, wherein the first resonant-tuned elongated body includes at least one of the following characteristics of the first resonant-tuned elongated body selected to generate the first predefined resonant frequency during operation of the turbine component: a length, at least one outer dimension, an outer dimension taper along a length thereof, a wall thickness of at least one location, a material, at least one attachment location to the turbine component, at least one attachment type to the turbine component, and a number of the elongated bodies.

3. The vibration dampening system of claim 1, wherein the one or more damper elements in the first body opening includes the first plurality of stacked washers and the second plurality of stacked washers arranged along a portion of the first resonant-tuned elongated body; and wherein a closure member is installed in the first body opening to prevent removal of the one or more damper elements.

4. The vibration dampening system of claim 1, wherein the turbine component includes a second body opening, and the vibration dampening system further comprises:

one or more damper elements in the second body opening;

a second resonant-tuned elongated body extending through an opening in the one or more damper elements in the second body opening, wherein the second resonant-tuned elongated body is configured to resonate at a second predefined resonant frequency, whereby the second resonant-tuned elongated body generates a force against the one or more damper elements in the second body opening; and wherein each of the one or more damper elements in the second body opening has a surface in contact with at least one of the second body opening and the second resonant-tuned elongated body.

5. The turbine component of claim 1, wherein the first predefined resonant frequency matches a resonant frequency of the turbine component at the first body opening.

6. A turbine component, comprising:

a body having a first body opening defined therein; and a vibration dampening system for dampening vibrations in the body and configured to be installed in the first body opening, the vibration dampening system including:

one or more damper elements in the first body opening;

a first resonant-tuned elongated body extending through an opening in the one or more damper elements in the first body opening, wherein the first resonant-tuned elongated body is configured to resonate at a first predefined resonant frequency; and wherein each of the one or more damper elements in the first body opening has a surface in contact with at least one of the first body opening and the first resonant-tuned elongated body, wherein the one or more damper elements in the first body opening includes a first plurality of stacked washers having a first outer dimension and a second plurality of stacked washers having a second outer dimension, wherein the first outer dimension and the second outer dimension are different, wherein the first outer dimension matches an inner dimension of the first body opening, and the second outer dimension is smaller than the inner dimension of the first body opening, and wherein the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

7. The turbine component of claim 6, wherein the first resonant-tuned elongated body includes at least one of the following characteristics of the first resonant-tuned elongated body selected to generate the first predefined resonant frequency during operation: a length, at least one outer dimension, an outer dimension taper along a length thereof, a wall thickness at at least one location, a material, at least one attachment location to the turbine blade, at least one attachment type to the turbine blade, and a number of the elongated bodies.

8. The turbine component of claim 6, wherein the one or more damper elements in the first body opening includes the first plurality of stacked washers and the second plurality of stacked washers arranged together along a portion of the first resonant-tuned elongated body; and wherein a closure member is installed in the first body opening to prevent removal of the one or more damper elements.

9. The turbine component of claim 6, wherein the turbine component includes a second body opening, and the vibration dampening system further comprises:

one or more damper elements in the second body opening;

a second resonant-tuned elongated body extending through an opening in the one or more damper elements in the second body opening, wherein the second resonant-tuned elongated body is configured to resonate at a second predefined frequency, whereby the second resonant-tuned elongated body generates a force against the one or more damper elements in the second body opening; and wherein each of the one or more damper elements in the second body opening has a surface in contact with at least one of the second body opening and the first resonant-tuned elongated body.

10. The turbine component of claim 6, wherein the first predefined resonant frequency matches a resonant frequency of the turbine component at the first body opening.

11. A method, comprising:

selecting a frequency of concern for a turbine component in operation at a body opening defined therein;

configuring a resonant-tuned elongated body to be positioned in the body opening to have a predefined resonant frequency that is same as the frequency of concern of the turbine component at the body opening;

positioning the resonant-tuned elongated body through an opening in one or more damper elements; and positioning the resonant-tuned elongated body with the one or more damper elements in the body opening, wherein the one or more damper elements in the body opening has a surface in contact with at least one of the body opening and the resonant-tuned elongated body, wherein the one or more damper elements in the first body opening includes a first plurality of stacked washers having a first outer dimension and a second plurality of stacked washers having a second outer dimension, wherein the first outer dimension and the second outer dimension are different, wherein the first outer dimension matches an inner dimension of the first body opening, and the second outer dimension is smaller than the inner dimension of the first body opening, and wherein the first plurality of stacked washers has a first inner dimension, and the second plurality of stacked washers has a second inner dimension, wherein the first inner dimension is larger than an outer dimension of the first resonant-tuned elongated body and the second inner dimension matches the outer dimension of the first resonant-tuned elongated body.

12. The method of claim 11, wherein the configuring the resonant-tuned elongated body includes selecting at least one of the following characteristics of the resonant-tuned elongated body to generate the first predefined resonant frequency during operation of the turbine component: a length, at least one outer dimension, an outer dimension taper along a length thereof, a wall thickness of at least one location, a material, at least one attachment location to the turbine blade, at least one attachment type to the turbine blade, and a number of the elongated bodies.

* * * * *